(12) United States Patent
Li et al.

(10) Patent No.: US 10,572,475 B2
(45) Date of Patent: Feb. 25, 2020

(54) LEVERAGING COLUMNAR ENCODING FOR QUERY OPERATIONS

(71) Applicant: Oracle International Corporation, Redwood Shores, CA (US)

(72) Inventors: Huagang Li, San Jose, CA (US); Angela Amor, Menlo Park, CA (US); Sankar Subramanian, Cupertino, CA (US); Chun-Chieh Lin, San Jose, CA (US); Vinita Subramanian, Campbell, CA (US)

(73) Assignee: Oracle International Corporation, Redwood Shores, CA (US)

( * ) Notice: Subject to any disclaimer, the term of this patent is extended or adjusted under 35 U.S.C. 154(b) by 273 days.

(21) Appl. No.: 15/713,365

(22) Filed: Sep. 22, 2017

(65) Prior Publication Data
US 2018/0089261 A1    Mar. 29, 2018

Related U.S. Application Data

(60) Provisional application No. 62/399,045, filed on Sep. 23, 2016.

(51) Int. Cl.
*G06F 7/00* (2006.01)
*G06F 17/30* (2006.01)
(Continued)

(52) U.S. Cl.
CPC .......... *G06F 16/2453* (2019.01); *G06F 16/23* (2019.01); *G06F 16/2456* (2019.01)

(58) Field of Classification Search
CPC .... G06F 16/23; G06F 16/2456; G06F 16/221; G06F 16/2453; G06F 17/30442; G06F 17/30498; G06F 17/30345
See application file for complete search history.

(56) References Cited

U.S. PATENT DOCUMENTS 6,678,674 B1 * 1/2004 Saeki ................. G06F 16/2448
7,020,661 B1 * 3/2006 Cruanes ............. G06F 16/2456
(Continued)

OTHER PUBLICATIONS

Hopeman, U.S. Appl. No. 15/268,521, filed Sep. 16, 2016, Interview Summary, dated Jun. 13, 2019.
(Continued)

*Primary Examiner* — Hasanul Mobin
(74) *Attorney, Agent, or Firm* — Hickman Palermo Becker Bingham LLP

(57) ABSTRACT

Techniques are described for leveraging column dictionaries of tables for join, group-by and expression evaluation operations. In an embodiment, a table is stored in one or more data units, each data unit's metadata containing dictionaries for stored columns. Rather than storing unencoded column values, the data units may store columns as column vectors of dictionary-encoded values, in an embodiment. When performing a join operation, a matching of values may be performed on the build-side table using the unencoded, unencoded, values stored in the join-key dictionary(s) of the probe-side table, thus, significantly reducing the number of searching and matching operations. In an embodiment, a group-by operation may be executed by performing partial aggregations based on unique group-by key values as stored in the one or more group-by key dictionaries. For an expression evaluation, only a single evaluation may be performed for each unique combination of expression-key values in a data unit by leveraging the one or more expression-key dictionaries.

40 Claims, 14 Drawing Sheets

(51) Int. Cl.
*G06F 16/2453* (2019.01)
*G06F 16/23* (2019.01)
*G06F 16/2455* (2019.01)

(56) References Cited

U.S. PATENT DOCUMENTS

| | | | |
|---|---|---|---|
| 9,251,210 | B2 | 2/2016 | Chaudhry et al. |
| 9,292,564 | B2 | 3/2016 | Kamp et al. |
| 9,535,956 | B2 | 1/2017 | Bellamkonda |
| 9,916,352 | B2 | 3/2018 | Chaudhry et al. |
| 10,067,954 | B2 | 9/2018 | Kociubes |
| 2010/0088309 | A1* | 4/2010 | Petculescu .......... G06F 16/2456 707/714 |
| 2010/0250517 | A1* | 9/2010 | Bendel ................ G06F 16/284 707/714 |
| 2011/0213766 | A1* | 9/2011 | Hong .................. G06F 16/284 707/718 |
| 2013/0117255 | A1 | 5/2013 | Liu |
| 2013/0275365 | A1 | 10/2013 | Wang |
| 2014/0067791 | A1* | 3/2014 | Idicula ................ G06F 16/283 707/714 |
| 2014/0172827 | A1* | 6/2014 | Nos .................... G06F 16/2423 707/722 |
| 2015/0379299 | A1* | 12/2015 | Klein .................. G06F 21/6227 713/193 |
| 2016/0103880 | A1* | 4/2016 | Attaluri ............. G06F 16/24544 707/714 |
| 2016/0147833 | A1 | 5/2016 | Chaudhry et al. |
| 2016/0378833 | A1* | 12/2016 | Chainani ............. G06F 16/2228 707/741 |
| 2017/0053010 | A1* | 2/2017 | Beyer .................. G06F 16/254 |
| 2017/0116242 | A1 | 4/2017 | Chavan et al. |
| 2017/0169133 | A1 | 6/2017 | Kim |
| 2017/0255675 | A1 | 9/2017 | Chavan et al. |
| 2018/0081939 | A1 | 3/2018 | Hopeman |
| 2019/0102412 | A1 | 4/2019 | Macnicol et al. |

OTHER PUBLICATIONS

Hopeman, U.S. Appl. No. 15/268,521, filed Sep. 16, 2016, Office Action dated Mar. 8, 2019.

KD Nuggets, "Apache Arrow and Apache Parquet: Why We Needed Different Projects for Columnar Data, On Disk and In-Memory", www.kdnuggets.com/2017/02/apache-arrow-parquet-columnar-data, Feb. 2017, 8pgs.

* cited by examiner

LEVERAGING COLUMNAR ENCODING FOR QUERY OPERATIONS

BENEFIT CLAIM

This application claims the benefit under 35 U.S.C. § 119(e) of provisional application 62/399,045, filed Sep. 23, 2016, the entire contents of which is hereby incorporated by reference for all purposes as if fully set forth herein.

FIELD OF THE INVENTION

The present invention relates to database systems and, more specifically, to leveraging in-memory columnar encoding for query operations to improve performance.

BACKGROUND

In a relational database management system (DBMS), a hash-based join operation (referred herein as "hash join") is used to join larger data sets. Hash join is particularly effective when a query requests a join operation that joins a table with a large data set with a table that has considerably smaller data set. Such queries are frequent as databases generally employ "snowflake" schemas where a large data set fact table is related to (and thus, frequently joined with) multiple much smaller build-side tables, which further describe various dimensions of entries in the probe-side table.

Regardless of whether a snowflake schema is employed by a database, the DBMS may use the smaller of two tables in a join operation to build a hash table in fast-access memory to perform a hash join. Such a joined table is referred herein as a "build-side" or "dimension" table, and this phase of a hash join is referred to herein as a "build phase." For the larger of the joined tables, referred to herein as a "probe-side" or "fact" table, the DBMS scans the table, probing the hash table based on comparing the hash values in the hash table with newly generated hash values from the scan of the probe-side table. This phase of a hash join is referred herein as a "probe" phase.

The probe phase of a hash join operation may be resource heavy. During the probe phase, the DBMS, for each row in a large data set, performs a) a hash value computation on a join key value(s) of the row, b) matching the hash value with the hash table of the build phase, c) retrieves the rows of the build-side table corresponding to the matched hash values and d) generates the result set.

Computing a hash value for millions of rows in a probe-side table can be very resource intensive. Other resource-heavy operations, such as additional comparisons of join key values and retrieving the matched build side row information, are also performed per each row of the probe-side table. Performing all these operations on millions of values becomes extremely taxing even for the most resourceful computing systems.

Other query operations, such as group-by and expression evaluations, have a similar performance bottleneck when used on large data sets. For example, for the group-by operation, a similar hashing of every value may be necessary to arrange the rows according to the group-by key values. Alternative to hashing, sorting according to the group-by key values, may be as taxing on computing resources as arranging based on hashing. The problem is further exacerbated with the group-by operation because the group-by operation is a blocking operation in query processing. Other operations have to necessarily wait for the group-by operation to complete in order for the other operations to execute, further delaying the execution time of the query.

One approach to expedite the operations, is to partition the probe-side table and perform the operations in parallel on respective partitions. Although such an approach may save query processing time, the amount of resources committed for hash computation does not change. Additionally, such parallel processing may starve other queries from executing in parallel.

A similar approach is to allocate much greater fast-access main memory to query operations on tables with large data sets and to fit more data into the volatile memory. Main memory typically comprises volatile memory, which is becoming cheaper and larger, thereby allowing more data to be cached from disk storage to volatile memory. Such caching allows fast access to the data, and for a DBMS that uses the data, speedier performance of the work. However, the amount of data that is typically in larger tables has also significantly increased. Particularly, in order to completely cache larger (probe-side) tables in volatile memory, the DBMS would require an exuberant amount of volatile memory. Thus, regardless of the size of volatile memory, there may still exist data (and in some cases a signification portion of data) that could not be concurrently cached in the volatile memory. Such data would necessarily be accessed from disk storage and loaded into cache on an as-needed basis (replacing other data in the cache).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
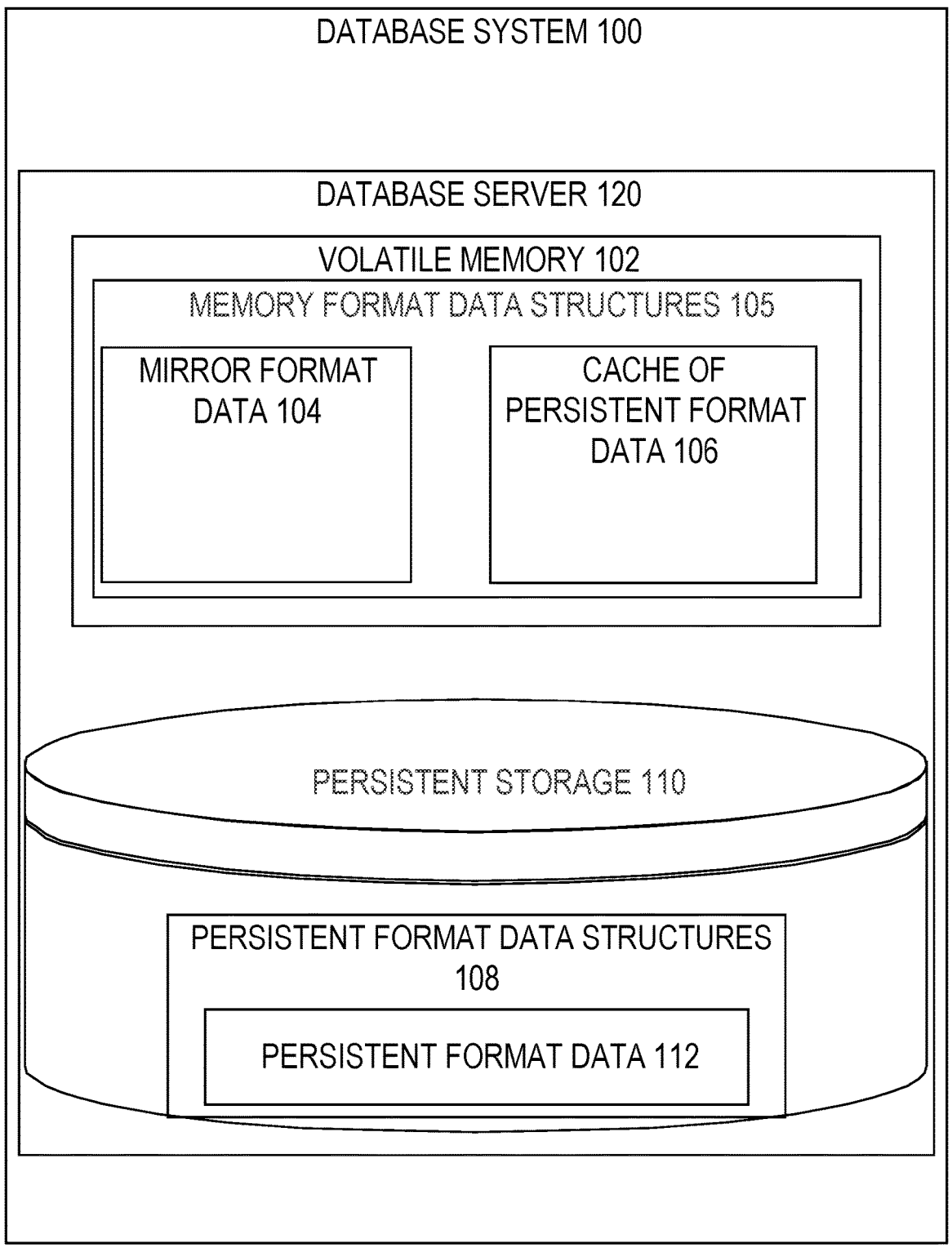
FIG. 1 is a block diagram of a database management system according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

To perform a join operation on a build-side (smaller) table and a probe-side (larger) table, each of the join key values of the probe-side table may be matched against the build-side table. Accordingly, the number of matching operations to be performed is at least the same as the number of rows in the (larger) probe-side table.

The matching operation for join key values may be resource intensive even when performed using optimized techniques such as hash-based join operation. For example, for a hash-based join operation, a hash table may be generated for the join key values of a build-side table. In an embodiment, each hash table entry corresponds to a distinct set of hash values of the build-side table join key values. Each hash table entry includes one or more hash buckets with pointers to the rows of the join key values from which the distinct set of hash values are generated. Additionally, when multiple hash buckets exist for a hash table entry, the hash entry may further contain a partial (or full) hash value of the join key value for which row the bucket has a pointer.

To perform the match operation using a hash table, a number of resource intensive operations need to be performed for each probe-side join key value. For example, a) the same hashing algorithm, that is used to generate the build-side table's hash table, is applied to a probe-side join key value, b) the resulting hash value may be further processed (using a modulus or other similar operation) to determine the corresponding entry in the hash table, c) the determined hash entry is then accessed to retrieve the corresponding build-side join key value(s), d) if the determined hash entry has more than one hash bucket, then the partial (or full) hash corresponding to each bucket is compared with the hash value to determine which hash bucket(s) to select, or e) alternatively or additionally, each hash bucket of the multiple hash buckets is iterated to retrieve respective build-side join key value(s), f) the build-side join key value(s) are then compared with the probe-side join key value to determine whether the corresponding rows should be joined with the probe-side row.

The operations described in the steps a) through e) may be performed for millions of probe-side rows of the probe-side table. Using techniques described herein, these steps may be performed only on a fraction of rows by performing these steps only for unique join key values of the probe-side table (or a data portion thereof), in one or more embodiments.

In an embodiment, to store more data in a memory-constrained system, the rows of the probe-side table are encoded using dictionary encoding for storage. At the same time, the (smaller) build-side table may be loaded into main memory unencoded and its join key values may be readily available for comparison with the probe-side table's decoded join key values. Because the build-side table is small and is loaded into main memory unencoded, less memory overhead is incurred to store unencoded values and processing overhead of decoding is avoided. On the other hand, while the probe-side table requires decoding operations, main memory usage overhead is reduced because an encoded column for a large table can be stored more efficiently in memory.

Additionally, dictionary-encoding of probe-side rows of a data portion generates new information about the probe-side data portion itself: an example of such information is the cardinality of unique values and the list of unique values for each column in the data portion. Such new information may be leveraged to make query operation(s) on the probe-side data portion more efficient.

In an embodiment, upon encoding a probe-side table, a DBMS generates a dictionary data structure for one or more columns of the probe-side table (or portions thereof). The dictionary data structure contains each unique unencoded value in the column (or a portion thereof) and a mapping of these unique unencoded values to their corresponding dictionary-encoded values. Each dictionary encoded column (or the portion thereof) is produced as a column vector of the dictionary codes which are mapped to the corresponding unencoded values using the dictionary data structure. The term "column dictionary" also refers herein to such a dictionary data structure.

In an embodiment, a query operation, such as a join operation, leverages the column dictionary(s) for a probe-side join key column, as the column dictionary(s) contain all the unique unencoded values in the join key column on which the query operation is operating. Accordingly, at least some of the steps for the query operation may be performed only on the unique unencoded values in the column dictionary rather than on each unencoded cell value of the column.

In one embodiment, a join operation of a received query is enhanced to be aware of the dictionary encoding(s) of corresponding data portions of the probe-side table for joining with unencoded values of the build-side table. Rather than decoding and matching each row's join key vector value of the probe-side table with the build-side table's unencoded join key values, unencoded values of the build-side table are matched to the unique unencoded values of the column dictionary of the join key vector.

The results of matches are used to generate a data structure referred to as payload array. Each element in the payload array corresponds to a dictionary code and may contain one or more pointers that each point to a build-side row having an unencoded value that matches a unique unencoded value of the dictionary code. A dictionary code is in effect an index of the payload array.

In an embodiment, the probe-side table data portion is scanned, and each scanned encoded value in the join key vector is used to identify a corresponding entry in the payload array that already contains the matched build-side row information. A result set row may be generated based on the selected row of the encoded value of the join key vector and the information in the identified entry of the payload array that contains information about the matched build-side table row(s). Once the result set is similarly augmented by processing all the data portions of the probe-side table, the result set is returned to a query requesting client computer system or the next operation in the query processing.

In various embodiments, group-by and/or expression evaluation operations similarly leverage the column dictionary(s) of data portions encoding group-by key values and/or expression measure key values. In such embodiments, group-by key column dictionary's unique values and/or expression key column dictionary's unique values are used to similarly improve group-by and expression evaluation operations respectively.

General Architecture

In an embodiment, table data may be persistently maintained in one format, but may be made available to a database server in a different format. In one embodiment, one of the formats in which the data is made available for query processing is based on the on-disk format, while another of the formats in which the data is made available for query processing is independent of the on-disk format.

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. Further details on a database system that utilizes the MF data and the PF data are described in "Mirroring, In Memory, Data From Disk To Improve Query Performance," U.S. patent application Ser. No. 14/337,179, filed on Jul. 21, 2014, referred herein as "Mirroring Data Application", the entire content of which is incorporated herein by this reference. According to one embodiment, the mirror format is completely independent of the persistent format. However, the MF data is initially constructed in volatile memory based on the persistently stored PF data, not based on any persistent MF structures.

FIG. 1 is a block diagram of a database management system according to one embodiment. Referring to FIG. 1, database system 100 includes volatile memory 102 and persistent storage 110. Volatile memory 102 generally represents the random access memory used by database system 100, and may be implemented by any number of memory devices. Typically, data stored volatile memory 102 is lost when a failure occurs.

Persistent storage 110 generally represents any number of persistent storage devices, such as magnetic disks, FLASH memory, and/or solid state drives. Unlike volatile memory 102, data stored in persistent storage 110 is not lost when a failure occurs. Consequently, after a failure, the data in persistent storage 110 may be used to rebuild the data that was lost in volatile memory 102.

Database system 100 may receive queries from one or more database applications (not shown) for execution on database server 120. To execute a query, database system 100, may first convert the query into an ordered set of operators used to access PF data 112 or MF data 104 in databases server 120. Each operator may contain one or more data operations on an output data of another operator or on PF data 112 or MF data 104.

PF data 112 resides on persistent storage device 110 in PF data structures 108. The PF structures 108 may be the structure of PF data 112 on any level of organization, for example, tables, columns, rows, row-major disk blocks, column-major disk blocks etc.

The volatile memory 102 further includes a cache 106 of PF data. Within cache 106, the data is stored in a format that is based on the format in which the data resides within the PF data structures 108. For example, if the persistent format is row-major disk blocks, then cache 106 may contain cached copies of row-major disk blocks.

On the other hand, MF data 104 is in a format that is unrelated to the persistent format. For example, in the case where the persistent format is row-major uncompressed disk blocks, the mirror format may be column-major compression units. Because the mirror format differs from the persistent format, MF data 104 is produced by performing transformations on PF data 112.

Database server 120 may perform these transformations, which may occur both when volatile memory 102 is initially populated with MF data 104 (whether at start-up or on-demand), and when volatile memory 102 is re-populated with MF data 104 after a failure. In an embodiment, database server 120 may select data from PF data 112 and mirror the data to generate MF data 104 based on one or more factors described below.

In an embodiment, MF data structures 105 are used for representing MF data 104 and/or cache of PF data 106. Such MF data structures may be dictionary encoded vectors based on database objects in the corresponding data portion.

Memory Format Data Structures

In an embodiment in which the MF data is compressed, the MF data may be organized, within volatile memory 102, into data portions. Each data portion stores a different set of MF data.

Figure 2:
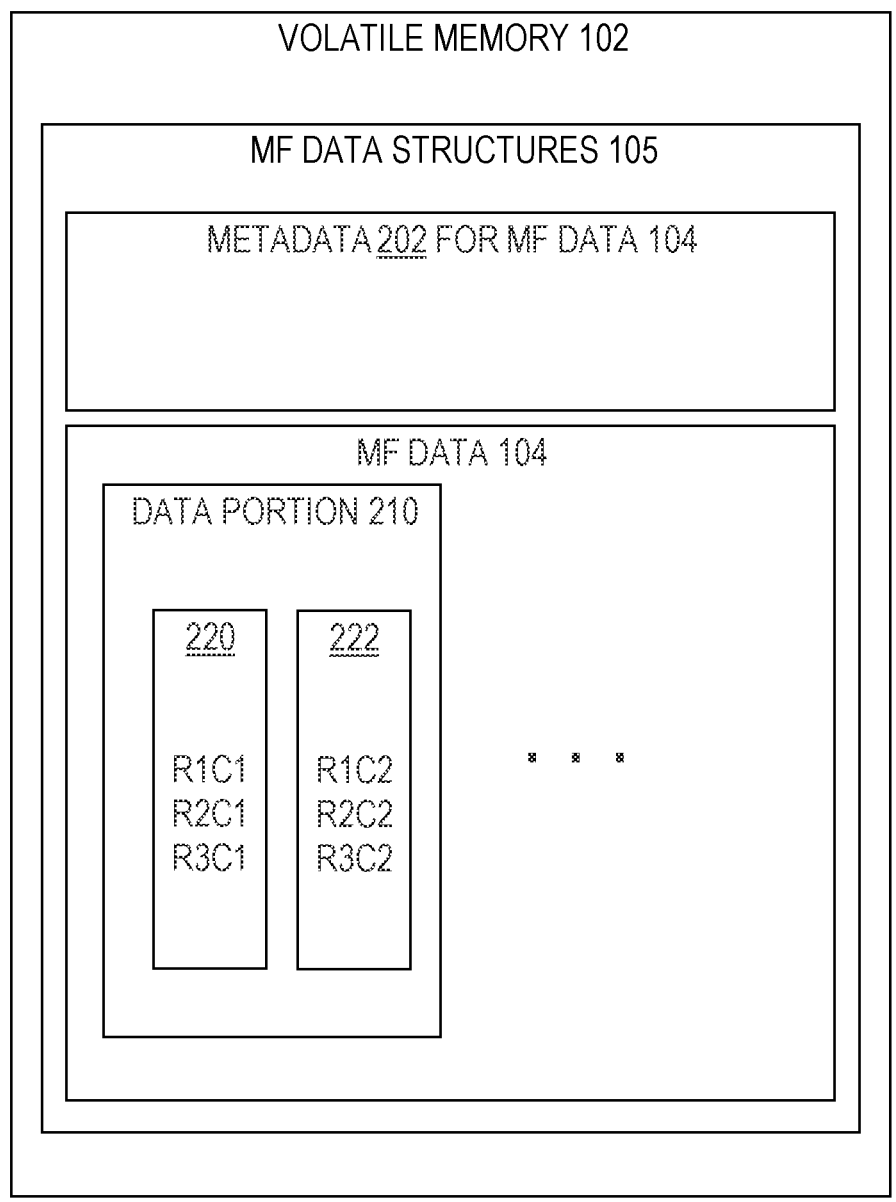
FIG. 2 is a block diagram illustrating how the data from a single table may be divided between data portions based on row ranges, according to an embodiment.

FIG. 2 is a block diagram illustrating how the data from a single table may be divided between data portions based on row ranges, according to an embodiment. As illustrated in FIG. 2, data portion 210 stores vectors 220 and 222, each of which contain only three rows of column "C1" and column "C2". This is only one of many different ways that the MF data may be spread among data portions. For example, different data portions may store MF data for different tables, different partitions of a table, different columns of a table, different segments, different extents, etc.

To determine whether the MF data has the data required to process a query, and if so, to find the MF data required to process the query, the database server needs to know which PF data is mirrored in the MF data, and specifically which specific PF data is mirrored by each data portion. Therefore, according to one embodiment, metadata 202 for the MF data is maintained in volatile memory 102, as illustrated in FIG. 2.

In one embodiment, metadata 202 includes a data-to-data portion mapping. The data-to-data portion mapping indicates which data is contained in each data portion. This indication may be made in a variety of ways, including storing data that indicates, for each data portion, one or more of the following:

the table(s) whose data is stored in the data portion
the column(s) whose data is stored in the data portion
the range of rows stored in the data portion
the range of the disk blocks whose data is stored in the data portion
the segments whose data is stored in the data portion the table partitions whose data is stored in the data portion
the extents whose data is stored in the data portion
the manner in which the data, within the data portion, has been compressed
the dictionary for decompressing the data stored in the data portion (when a dictionary-type encoding has been used to compress the PF data)

In the situation illustrated in FIG. 2, the data-to-data portion mapping may indicate, for example, that rows r1-r3 of columns c1 and c2 are stored in data portion 210.

Column Dictionaries

In an embodiment, one or more data portions store dictionary encoded values of actual, unencoded, values of a database object in the data portion's cell elements. Each cell element corresponds to a particular row and a particular column of the database object, such as a probe-side table. The cell elements may be arranged as a column vector that mimics the particular column arrangement within the database object. When multiple column vectors are stored in a data storage unit, the column vectors can be stored in a column major or a row major format.

Furthermore, the DBMS may maintain a column dictionary for each column vector, mapping that column vector's dictionary encoded values to the corresponding values in the database object, such as a table or a portion thereof. Such column dictionaries for a data portion contain at least all unique database object values for data represented in the data portion for the corresponding columns of the database object.

The column dictionaries may arrange the mapping in many different ways using various dictionary encodings. In an embodiment, a dictionary encoded value in a cell element is an index to an entry in a column dictionary that contains the corresponding database object value. Thus, the corresponding database object value can be retrieved from the column dictionary by specifying the dictionary encoded value as an index to the column dictionary.

Figure 3:
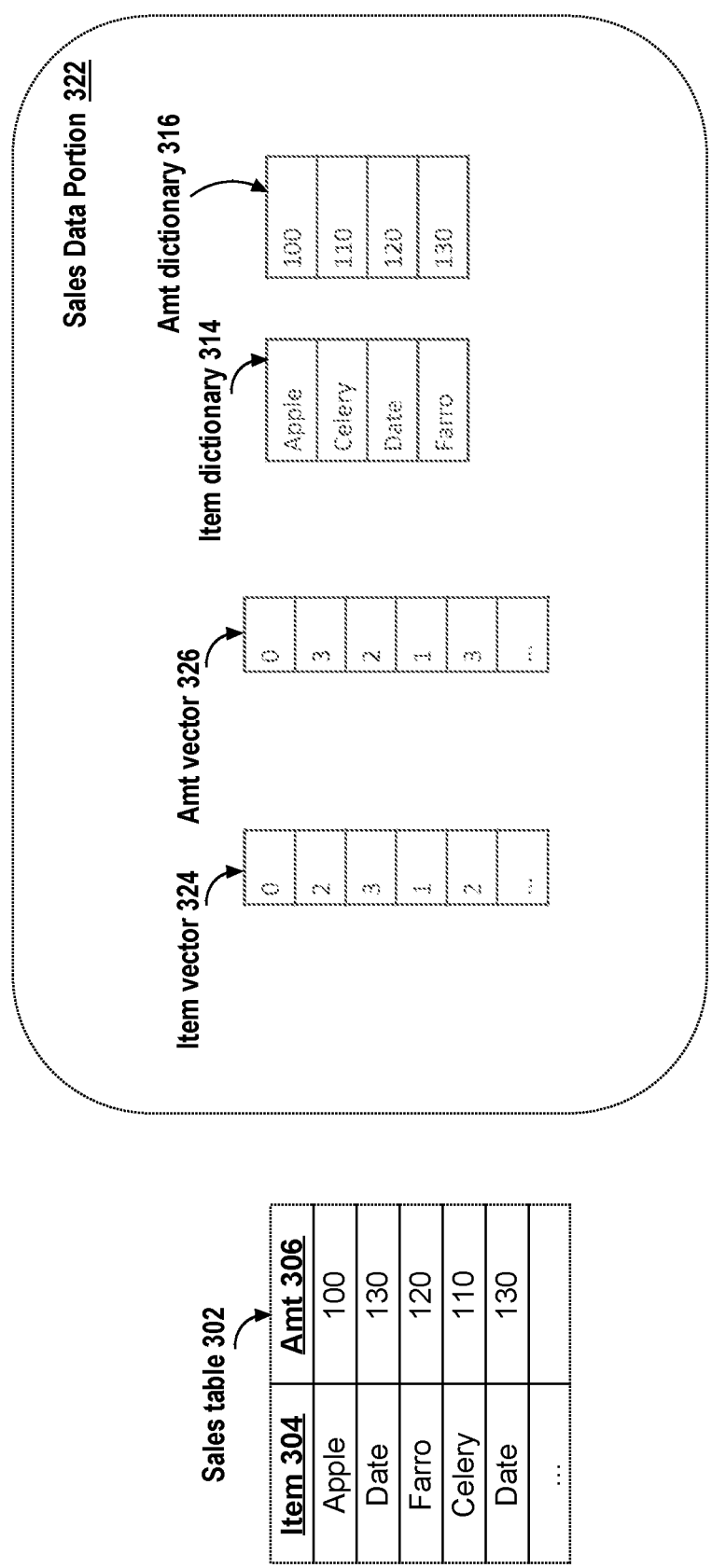
FIG. 3 is a block diagram that depicts examples of a data portion that includes a dictionary structure for a database object, in an embodiment.

FIG. 3 is a block diagram that depicts examples of a data portion that includes a dictionary structure for a database object, in an embodiment. Database object "Sales" table 302 contains two columns: "Item" column 304 and "Amount" column 306. Since "Item" column 304 contains four different values: "Apple", "Celery", "Date" and "Farro", column dictionary 314 contains four values in a zero based index vector. Instead of data portion 322 storing the unencoded values from "Item" column 304, "Item" column vector 324 of data portion 322 stores in its cell elements the dictionary encoded indices of column dictionary 314 that correspond to the unencoded values at "Item" column 304 for a particular row. For example, the first row of "Item" column 304 contains the value of "Apple." Based on column dictionary 314, the "Apple" value is at the zero index. Accordingly, "Item" column vector 324 stores zero at the first row. Similarly, the "Date" value at the second row of "Item" column in "Sales" table 302, corresponds to index two in column dictionary 314. Thus, the index value of two is stored at the second row of "Item" column vector 324. The rest of "Item" column 304 and "Sales" column 306 are stored similarly in column vectors 324 and 326 using dictionaries 314 and 316, respectively.

In an embodiment, dictionary encoded values in a column vector are based on memory addresses of entries in a corresponding column dictionary. The column dictionary may store unique unencoded values of a column in a contiguous memory space, each entry of a unique unencoded value being at a particular offset from the first entry's memory address. These offsets are equivalent to indices of the column dictionary, and cell elements of the column vector may store the offsets of the corresponding unique unencoded value as dictionary encoded values. According to such an arrangement, a look up of a unencoded value is performed by request for a value at a particular offset from the first entry memory address.

In an embodiment, a data portion containing column vectors and dictionaries, is generated as part of Ozip compression of a database object using techniques described in U.S. patent application Ser. No. 14/337,113, filed Jul. 21, 2014, the contents of which are incorporated herein by this reference. According to such techniques, a packed sequential plurality tokens are generated from the input database object data and a static dictionary data structure, such as a column dictionary, is used to decode the tokens into unencoded values of the input database object data.

In an embodiment, data portions are generated in response to receipt and processing of a query. The data portions may be stored in a volatile and/or persistent memory managed by the DBMS. Thus, next time a query referencing the same table is received, the data portions may not need to be regenerated but rather the already existing data portions are used. In another embodiment, data portions are generated independent of a query receipt by the DBMS. Data portions may be generated when database objects that are stored persistently in the persistent data format, are mirrored into volatile memory in a mirror format as described in Mirroring Data Application.

In an embodiment in which the MF data is compressed, the MF data may be organized, within volatile memory of a DBMS, into "in-memory compression units" (IMCUs). Each IMCU stores a different set of MF data. For example, one IMCU may store half of column vectors of a table, and another IMCU may store the other half of column vectors, which together would make up a table. Specifically, one IMCU may include a vector portion that stores half of the values from a first column of a table, and another vector portion that stores half of the values from a second column of the table. Similarly, another IMCU may include a vector portion that stores the remaining half of the values from the first column of the table, and yet another vector portion that stores the remaining half of the values from the second column.

In such an example, the IMCUs divide the MF data based on the rows to which the data belongs, where one IMCU corresponds to a portion of the rows in the table, and another IMCU corresponds to another portion of rows in the table. However, this is only one of many different ways that the MF data may be spread among IMCUs. For example, different IMCUs may store MF data for different tables, different partitions of a table, different columns of a table, different segments, different extents, etc.

To determine whether the MF data has the data required to process a query, and if so, to find the MF data required to process the query, the database server needs to know which PF data is mirrored in the MF data, and specifically which specific PF data is mirrored by each IMCU. Therefore, according to one embodiment, metadata for the MF data is maintained in volatile memory.

In one embodiment, metadata includes a data-to-IMCU mapping. The data-to-IMCU mapping indicates which data is contained in each IMCU. This indication may be made in a variety of ways, including storing data that indicates, for each IMCU, one or more of the following:

the table(s) whose data is stored in the IMCU the column(s) whose data is stored in the IMCU the range of rows stored in the IMCU the range of the disk blocks whose data is stored in the IMCU the segments whose data is stored in the IMCU the table partitions whose data is stored in the IMCU the extents whose data is stored in the IMCU the manner in which the data, within the IMCU, has been compressed the dictionary for decompressing the data stored in the IMCU (when a dictionary-type encoding has been used to compress the PF data)

In a related embodiment, a data portion may be maintained as an IMCU and one or more column dictionaries for the data portions may be stored as the metadata of the IMCU. Accordingly, once IMCUs are generated as the MF data of a database object, the DBMS may use the IMCUs that include column dictionaries to perform join, aggregation and/or function evaluation operations as described below.

In an embodiment, PF data may be stored in persistent memory using dictionary encoding techniques described. Accordingly, once PF data of a database object is loaded into memory, the DBMS may use the column dictionaries of the column vectors in PF data to perform join, aggregation and/or function evaluation operations as described below.

Generating Join Key Value Mapping Data Structure for Build-Side Table

When a query with a join is received by a DBMS, the DBMS may process the query by performing a transformation-based join operation, such as a hash join operation. Values of a joined table are transformed (e.g. by an application of a hash algorithm) to be used for as look-up values for identifying matching join key values from the co-joined table, in an embodiment. The DBMS may generate a special join key value mapping data structure (e.g. hash table) for a fast look-up-based matching. Thus, to perform a transformation-based join operation, one of the joined tables may be loaded into a volatile memory and a join key value mapping data structure is generated for the join key(s) of the loaded table, while the tuples from the other joined table are probed against the generated data structure. To improve the query performance and to save memory resources, the smaller of the joined tables, the build-side table, is loaded into the volatile memory, while the larger of the joined tables' join key values are probed against the hash table of generated from the build-side table, in an embodiment.

In one embodiment, a hash table may be used for the join key value mapping data structure in which each hash value represents one or more unique join key values and the hash value is mapped to the row(s) of those one or more unique join key values. If the same hash value represents multiple different unique join key values (due to hash collision), the entry in the hash table, also referred to as a hash bucket, may store respective references to each of the rows containing the different join key values, and the un-hashed (unencoded) join key values of those row(s) may further be compared with a probed value for an accurate match. In an embodiment, even if an entry of a hash table has a single hash bucket with a single reference, the DBMS compares the referenced unencoded join key value from the build-side with the probe-side unencoded join key value to ensure that a match has indeed occurred. In an embodiment, in which an entry of a hash table corresponds to multiple hash values, the entry may similarly include multiple hash buckets. In such an embodiment, the DBMS may resolve multiple references of the respective hash buckets and compare the respective unencoded join key values to determine if a match exists.

Figure 4:
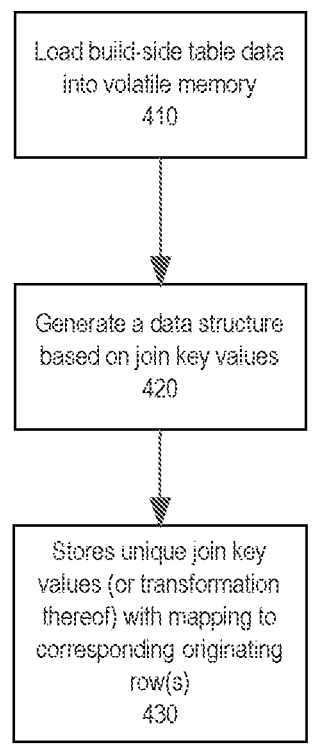
FIG. 4 is a flow diagram depicting a process for generating a join key value mapping data structures, such as a hash table, for the build-side table in a join operation, in an embodiment.

FIG. 4 is a flow diagram depicting a process for generating a join key value mapping data structures, such as a hash table, for the build-side table in a join operation, in an embodiment. At step 410, the DBMS loads the build-side table of the joined tables into main memory. In some embodiments, the build-side table (although being smaller than the probe-side table) does not fit into the main memory, or the DBMS does not have enough main memory resources to load the build-side table into the volatile memory for processing. In such an embodiment, the build side table is partitioned based on the join key using, as an example, hash or range-based partitioning techniques. The DBMS loads as many of the partitions of the build-side table as possible into the available volatile memory, at step 410, to process the portion of the join key values corresponding to the loaded partitions. The build-side partitions that are not loaded into the volatile memory may be processed using partition-wise join techniques.

At step 420, the DBMS generates a join key value mapping data structure for probing to quickly lookup a join key value in the build-side table (or partitions thereof) and retrieve the row(s) corresponding to the matched join key value. The DBMS stores the join key values and/or transformed values of join key values with the mapping to the corresponding rows at step 430.

Figure 5:
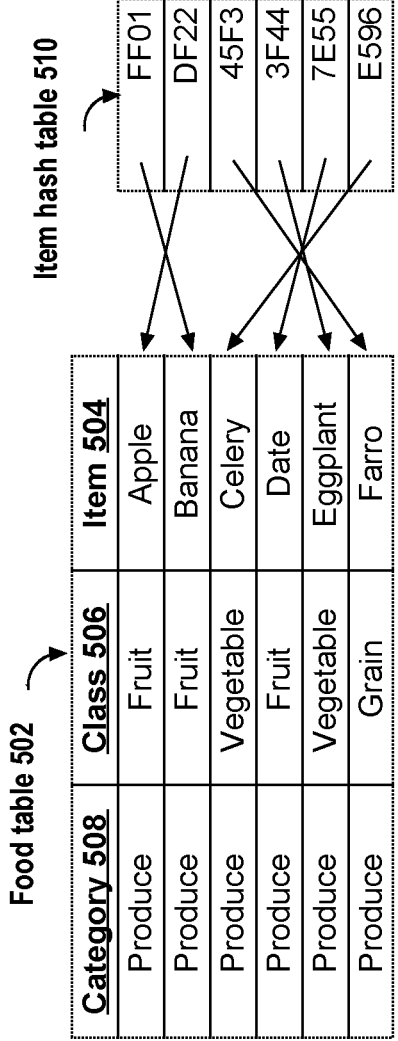
FIG. 5 is a block diagram depicting an example of a hash table generated based on a join key of a build-side table, in an embodiment.

In one embodiment, the DBMS generates a hash table data structure that stores references to build-side table rows corresponding to the hashed values of the respective build-side table join key values, as described above. FIG. 5 is a block diagram depicting an example of a hash table generated based on a join key of a build-side table, in an embodiment. Item hash table 510 is a hash table generated by performing a hash operation on values in Item column 504 of Food table 502. Item hash table 510 stores pointers to the corresponding rows from which the join key was used to generate the respective hash value. For example, the join key value of "Apple" from Item column 504 is hashed to generate "DF22" hash value. The hash value is then used to determine the entry in Item hash table 510 to store the pointer value pointing to the memory location of the first row of Food table 502 which stores the join key value of "Apple" as depicted by an arrow to the first row from the "DF22" entry.

Probing Using Dictionary Values

In an embodiment, in a probe phase of a join operation, the DBMS compares each unique unencoded value in a column dictionary for a data portion of the probe-side table with the join key values of the build-side table. The unencoded values in the column dictionary are the unique join key values of the probe-side table in the data portion. Accordingly, if a unique join key value of the column dictionary is matched with a join key value in the build-side table, then there is at least one row in the data portion of the probe-side table that can be joined with the matched row in the build-side table.

To record matches of join key values, the DBMS maintains a payload array that records the matched join key value and one or more pointers (or copies of) to the respective rows of the build-side table. In some embodiments, when a join operation is a full join, a semi-join (e.g. a left outer join) or an anti-join, unmatched unique join key values of the column dictionary are also maintained by the payload array with a corresponding status representing the lack of match.

In another embodiment, in which the build-side table has been partitioned for lack of main memory space, a full set of build-side join key values (or representations thereof) may be still available for comparison. In such an embodiment, the matched unique join key value may still be recorded in a payload array but with empty (NULL) data for the respective rows in the build-side table and/or with corresponding status data indicating that matched rows are not located in the current partition of the build-side table. In yet another embodiment, in which the build-side table is partitioned without the full set of join key values represented in the mapping data structure, the unmatched probe-side join key values are inserted into the payload array with empty (NULL) data for the build-side row information. The corresponding status data is updated to indicate that joined keys have not been matched in the current partition of the build-side table. When the next partition of the build-side table is loaded into a volatile memory, the payload entries with such a status are retrieved and matched with join key values of the new partition, and the payload entries updated based on the match.

In an embodiment, the payload array does not store copies of join key values to save memory space. The payload array is instantiated to have the same number of entries as the column dictionary of the probing data portion of the probe-side table. In such an embodiment, each entry in the payload array intrinsically corresponds to a unique join key value entry in the column dictionary. For example, the first payload array entry corresponds to the join key value at the first entry in the join key column dictionary, and the fifth payload array entry corresponds to the join key value at the fifth entry of the join key column dictionary.

During the comparing with the build-side table join key values, the matched (or unmatched) join key values may not be inserted into the payload array, rather the entry in the payload array corresponding to the probe-side join key value is updated with status data indicating that the unique join key value has been matched (or not matched) with the join key values of the build-side table. The entries of the matched join key values may contain pointers (or copies) of the corresponding row data from the build-side table necessary for producing the result set.

Figure 6:
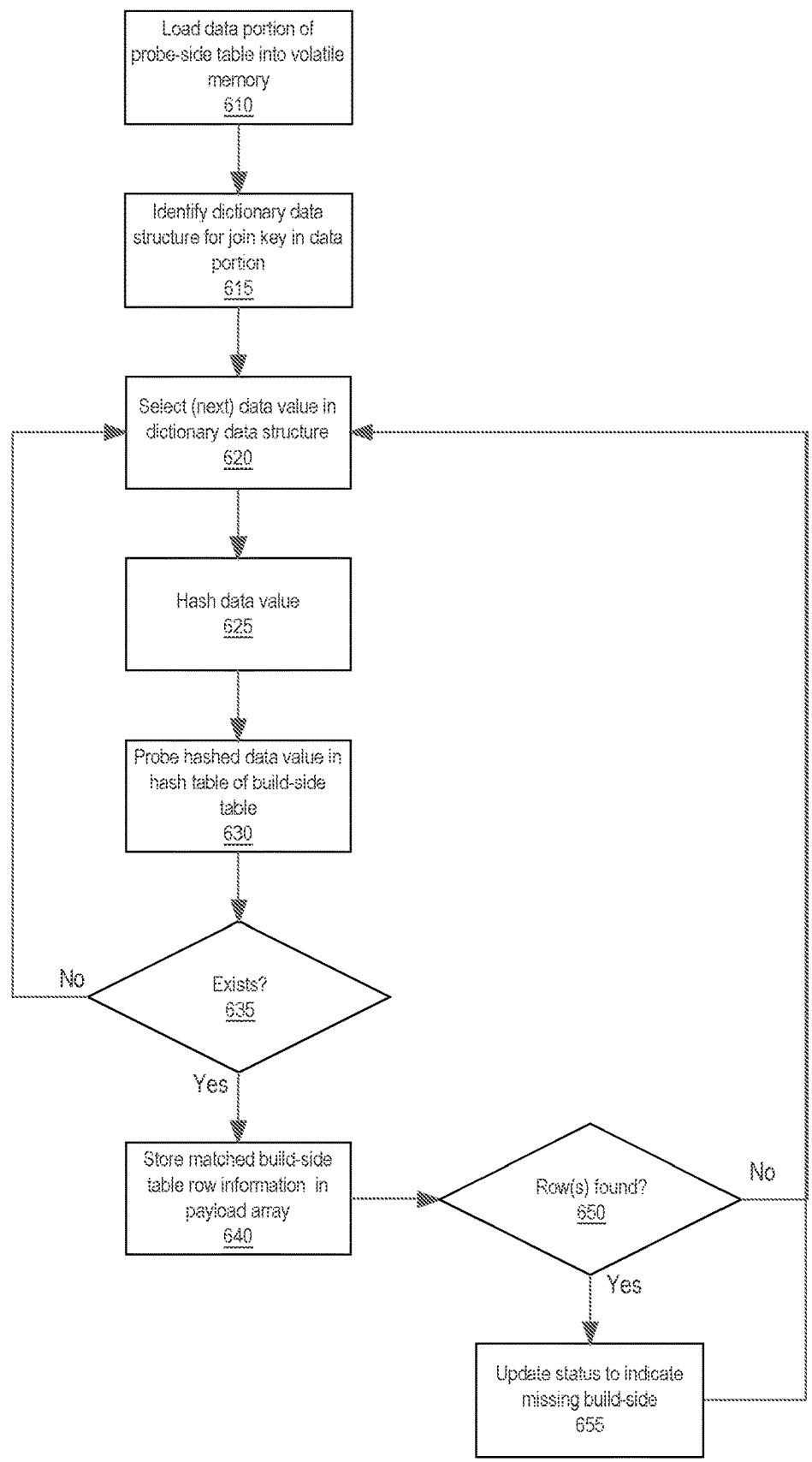
FIG. 6 is a flow diagram that depicts a process for matching rows of build-side table that correspond to the values in a column dictionary, in an embodiment.

FIG. 6 is a flow diagram that depicts a process for matching rows of build-side table that correspond to the values in a column dictionary, in an embodiment. At step 610, while processing the query, the DBMS loads one or more data portions of the probe-side table into a volatile memory unless already loaded for a previous operation. At step 615, the DBMS identifies the column dictionary for the join key of the probe-side table. The join key column dictionary may be stored along other column dictionaries in the metadata of the data portion.

At step 620, the DBMS iterates through all unencoded data values in the column dictionary to match them with the build-side table join key values. To do so, at step 625, each data value in the column dictionary is transformed to be compared with the transformed join key values in the build-side table. The comparison may be done using the join key value mapping data structure generated from the build-side table as described below. In one embodiment, a join key value of the column dictionary is used as a lookup value into the join key value mapping data structure such as a hash table. As part of the lookup operation into the hash table, the values of the column dictionary may be hashed using the same algorithm used in hashing join key values of the build-side table to generate the hash table.

To compare unencoded values of the column dictionary, at step 630, the DBMS uses the hash representation of the selected unencoded value to lookup into the build-side table's hash table.

For example, for below query Q1, a data portion of Sales probe-side table is joined with a food table using probe-side table column dictionaries described in FIG. 3 and build-side table 510 described in FIG. 5.

Figure 7A:
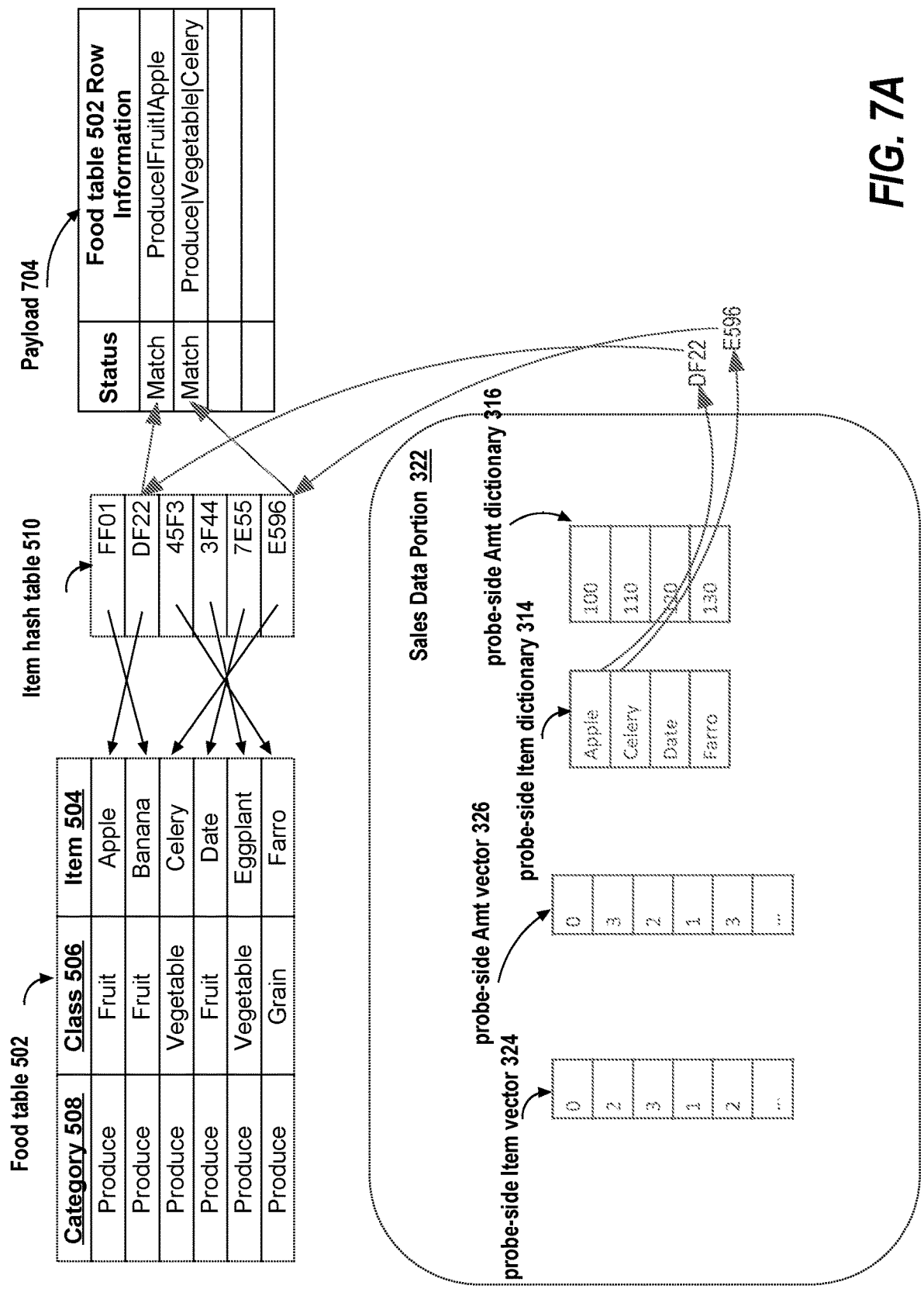
FIG. 7A is a block diagram that depicts an example of hash based join of a probe-side table column dictionary with a build-side table hash table according to one embodiment.

Q1: select Food. Class, Sales.Amt
    from Food, Sales
    where Sales.Item=Food.Item FIG. 7A is a block diagram that depicts an example of hash based join of a probe-side table column dictionary with a build-side table hash table according to one embodiment. In such an example, the DBMS iterates through unique join key values of Item column in Sales data portion 322 stored in probe-side table Item dictionary 314. The DBMS uses a look up function into Item hash table 510 and inputs each entry of the unencoded values in dictionary 314 to determine whether matching join key values (and respective rows exist) in Food table 502. The look up function uses the same hash algorithm as hash table 510 to hash the unencoded values of dictionary 314 to identify entries in the hash table that correspond to the build-side's own hash values. For example, the "Apple" unencoded value of dictionary 314 is hashed to "DF22" which corresponds to the second entry in Item hash table 510.

Continuing with FIG. 6, at step 635, if one or more build-side rows are identified by the second entry of the hash table, then the one or more build-side table rows corresponding to the "DF22" value may be joined with the probe-side table rows corresponding to the unencoded value that yielded the "DF22" value.

A hash collision or a single hash bucket corresponding to multiple different hash values in the hash table could misrepresent equivalence in the hash values of a probe-side join key value and build-side join key value. In such a case, the unencoded untransformed values of the successfully probed hash value(s) actually may not match. In a related embodiment, to make sure that the join key value of the matched build-side rows indeed equates to the unencoded dictionary value from the probe-side table, the unencoded dictionary value is compared to the join key values of the build-side table at the row(s) referenced by the matched hash table bucket.

A payload array may be used to record the mapping of build-side table rows corresponding to the hash table with the corresponding column dictionary value of the probe-side table, at step 640. In an embodiment in which payload array index corresponds to the column dictionary index, the matched build-side table row information is stored at the index of the selected unencoded dictionary value whose hash has been matched with the build-side table hash table. In another embodiment, the encoded value of the selected join key value is stored in the payload table in association with the corresponding build-side table row information.

The hash bucket referenced build-side table row information may be stored in the payload array using different techniques, such as storing memory pointers to each cell in the corresponding build-side table rows with the information on the length of the cell entry value. Another technique, is to store the full unencoded cell values of the build side row in the payload array entry.

Additionally or alternatively, the payload array may store status data about the join key value. In an embodiment, in which all join key values from the column dictionary of the probe-side table have an entry in the payload array, the status data may contain information about which of the join key values has matched or not. In an example in which multiple rows of the build-side table have a common join key value from the column dictionary of the probe-side table, the status data may contain a memory pointer to a list of row information for each of the rows. The status data may additionally contain information about whether or not the matched join key's corresponding build-side table row is in the partition of the build-side table currently loaded in the main memory.

For example, in FIG. 7A, the DBMS initializes payload array 704 with the same number of entries as the probe-side Item dictionary 314. Status field of payload 704 may be initialized to a status indicating unmatched for all entries. When the "Apple" unencoded value stored in the first entry of probe-side Item dictionary 314 is matched with the corresponding "Apple" value in Food table 502 based on the matching hashes, the DBMS updates at the Status field of the first entry of payload array 704 indicating a match. The rest of the first entry is used to store information pointing to the first row of the food table 502. Similarly, when "Celery" value from probe-side Item dictionary 314 is matched with the "Celery" value of the third row of the Food table 502, payload 704 has the second entry status updated to indicate a match. Additionally, the food table 502 row information of the second entry of payload array 7002 is updated to contain information pointing to the third row of Food table 502.

Continuing with FIG. 6, the DBMS continues to iterate through unencoded values in the column dictionary that represent the unique values of the corresponding join key column in a data portion and update the payload array. The payload array may not be updated, if there is no match found in the build-side table's hash table at step 635.

In an embodiment, in which the build-side table is requested to be left outer joined with a probe-side table by a query, the DBMS may maintain a separate unmatched value vector, which has an entry for every unique value of the build-side table, similar to the hash table. If an entry in the build-side table hash table is matched, the corresponding entry in the unmatched value vector is updated to indicate so. After all data portions of probe-side table have been processed, the unmatched value vector can be used to select the unmatched rows of the build-side table for the result set in the left outer join operation on the build-side table.

The DBMS may match multiple rows of build-side table for a single unencoded column dictionary value from the probe-side table, at step 635. In such an embodiment, the matching entry in the hash table may reference multiple build-side table rows. The status data of the entry for such a dictionary value in the payload array may indicate such information by the status (or the row information of the payload array) containing a memory pointer to a list of row point information for each of the referenced rows in the hash table, as an example.

In an embodiment, in which multiple columns are used to join a probe-side table with a build-side table, all permutations of the unencoded data values of the column dictionary (s) corresponding to the multiple join keys are combined and used in combination for comparing with the similar combination of join key values of the build-side table. For example, if two join keys are specified for the probe-side by the query, both dictionary data structures for the two join keys are used in the comparison. If one column dictionary has six unique unencoded values and the other column dictionary has seven unique unencoded values, then there will be 42 unique combinations to use for the lookup. Accordingly, the DBMS may hash each such a combination of probe-side table join key values using the same hash algorithm as part of the lookup into the hash table of the build-side table.

Once the payload array is updated for the values in the probe-side table column dictionary for the selected data portion, the DBMS may proceed to "unpack" the payload array and/or generate a partial result set for the join operation from the payload array. In an embodiment, in which the payload array contains references to the build-side table rows' column values rather than actual column values, the payload array may be "unpacked" to contain the full unencoded column values. To unpack, the DBMS iterates through the payload array and re-generates a new payload array that contains, in addition to the statuses, actual column values of the referenced build-side rows. Accordingly, generation of a (partial) result set, as described below, not only excludes any hashing (or looking up into a hash table that causes a hash of a lookup value to be generated) but also "unpacking" of build-side table references.

Thus, the DBMS saves considerable resources by performing the matching for the join key values that are only in the column dictionary of the data portion (unique join key values) rather than every join key value of the join key of the probe-side table in the data portion. Additionally, for the embodiments in which copies of matched build-side rows are stored in a payload array, the DBMS may save considerable resources by resolving build-side table references and retrieving build-side column values only per join-key dictionary value rather than for every probe-side table row.

Generate Result Set from Payload Array

In an embodiment, the generated payload array for the column dictionary is "resolved" into a (partial) result set based on the encoded join key entries in the data portion of the probe-side table. The "resolving" term refers to generating at least partial result set for the join operation by iterating through the rows of a probe-side table row set in the data portion. The encoded join key value of the iterated row is used for retrieving the corresponding payload array entry. Based on the selected payload array entry, one or more result set entries may be generated by retrieving one or more build-side table rows referenced by the payload array entry.

Figure 8:
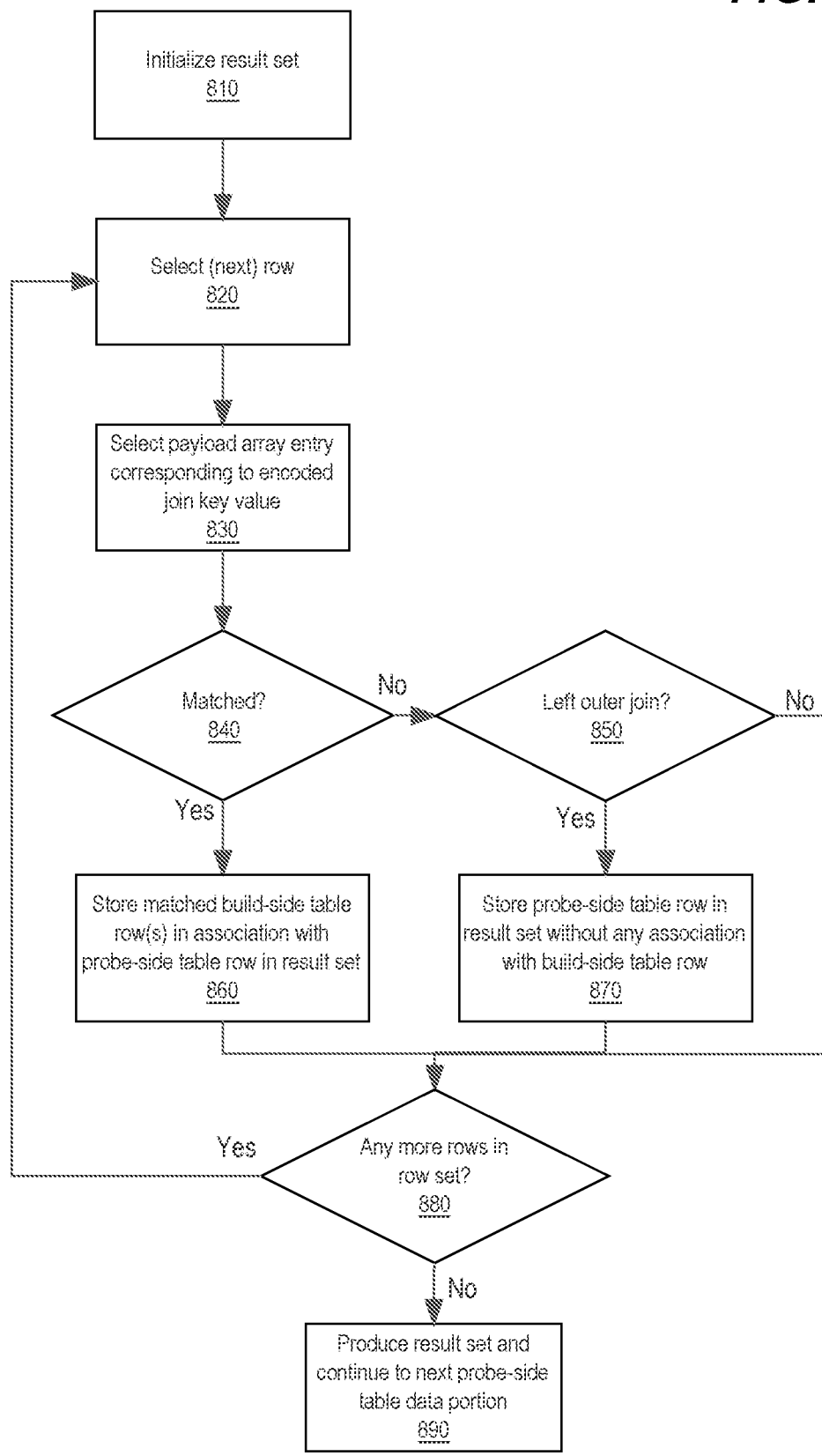
FIG. 8 is a flow chart that depicts the process for resolving the payload array generated based on a dictionary data of a data portion of a probe-side table and the joined build-side table into a partial result set, in an embodiment.

FIG. 8 is a flow chart that depicts the process for resolving the payload array generated based on dictionary data of a data portion of a probe-side table and the joined build-side table to generate a partial result set, in an embodiment. At step 810, the result set is initialized. The result set may comprise of columns from the build-side and/or probe-side tables selected by the query. In an embodiment, in which the join operation left outer joins the build-side table, the result set may be initialized by the unmatched rows of the build-side table because the left outer join operation on the build-side table has to include rows that have not been matched.

At step 820, rows in the probe-side table data portion are iterated. In an embodiment, the DBMS may maintain a skip row vector for the probe-side table rows that have been filtered out. For example, one or more equation predicates for one or more probe-side table columns may cause the DBMS to generate a skip bit vector associated with the row set. Each entry in the skip bit vector corresponds to a row in the row set of the probe-side table in the data portion. If a row is to be skipped due to the evaluated equation predicate (s), the corresponding skip bit vector entry indicates such state by a set or clear bit value. For example, if the selected row, at step 820, is denoted to be skipped by the skip bit vector, then the DBMS reads the next row, at step 820.

At step 830, the selected probe-side table's row's encoded join key value is retrieved from the join key vector and is used to select the corresponding entry in the payload array. If, at step 840, the corresponding entry indicates that there is at least one matching build-side table row, at step 860, each of the matched build-side table rows, which are referenced by or stored in the row information in the payload array entry, are stored in the result set, as a separate row, in association with the selected probe-side table row.

On the other hand, if, at step 840, the payload array indicates no match of build-side table rows, the selected probe-side table row may still be stored as part of the results set, if the probe-side table is left outer joined by the join operation. At step 850, if the join operation is a left outer join with the probe-side table, then the selected probe-side table row is stored at step 870.

Figure 7B:
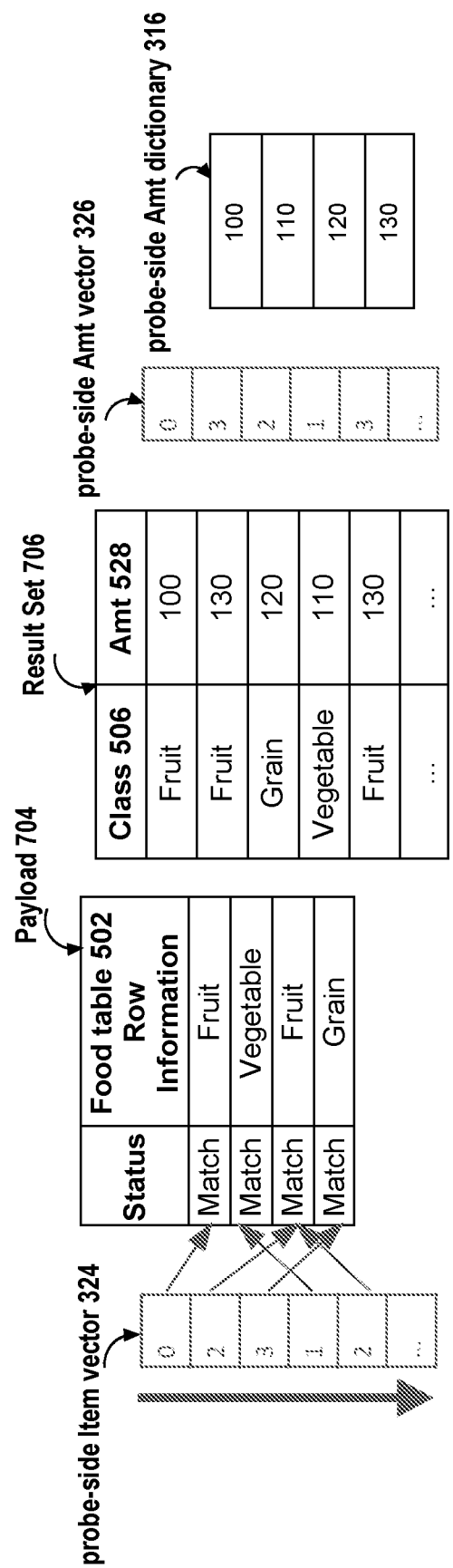
FIG. 7B is a block diagram that depicts an example of using a payload array to generate the result set, in an embodiment.

As an example of a result set generation using the steps depicted in FIG. 8, FIG. 7B is a block diagram that depicts an example of using a payload array to generate the result set, in an embodiment. Continuing with the Q1 query execution example in FIG. 7A, Item vector 324 from the Sales table data portion 322 is iterated through. Each encoded value stored in Item vector 324 corresponds to the location of an entry in Payload 704. For example, Item vector 324 value "0" corresponds to the first entry in Payload 704, while the value of "2" corresponds to the third entry in Payload 704.

For the encoded join key value of "2" of Item vector 324, the corresponding Payload 704 entry at the third row has a matched status. Thus, the corresponding row information of the Payload 704 entry, "Fruit", is stored into the row of Result Set 706 corresponding to the probe-side Item join key value. The same row of the matched join key value in "Sales" table 302 has a corresponding encoded value of 3 in Amt vector 326, which, using Amt dictionary 316, is decoded into the value of 130. Accordingly, the value of 130 is inserted in Result Set 706. The same process may be repeated for the other encoded join key values of Item vector 324 in such an example.

Continuing with FIG. 8, at step 880, the DBMS may exhaust all rows in the probe-side table of the data portion. At step 890, the DBMS may produce the result set for the next operation in the query plan, while at the same time similarly processing the next data portion of the probe-side table. Alternatively, the DBMS may keep augmenting the result set by processing next data portions of the probe-side table until all data portions of the probe-side table have been processed.

In an embodiment, for the next data portion, the DBMS maintains the payload array generated for the previous data portion, if the next data portion uses the same dictionary encoding as the previous data portion. In such an embodiment, the DBMS performs resolving of the payload array into a partial result set of the next data portion without performing the steps to generate the payload array for the column dictionary.

For example, the DBMS may obtain the dictionary encoding identifier for the join key column dictionary of the next data portion. If the obtained identifier matches the previous data portion's dictionary encoding identifier, then the DBMS maintains the payload array and omits the re-generation of the payload array. Rather, the DBMS starts iterating through the row set of the probe-side table of the next data portion and resolves the payload array into a result set as described in the process depicted in FIG. 8, in an embodiment.

Group-by Operation

In an embodiment, a group-by operation leverages column dictionaries of one or more data portions that contain the group-by key referenced in a received query. A DBMS may receive a query specifying a "group-by" clause for the queried data set to be split based on the values of one or more columns specified in the group by clause. The "group-by key" term refers to a column of a table specified in the group-by clause of the query. The query may also specify one or more aggregate functions for aggregating columns that are selected but are not used for splitting the selected data set. Aggregate functions include minimum, maximum, percentile, average and median among other aggregate functions. The "measure key" term refers to a column which is referenced by an aggregate function in the received query. The values of the measure key are aggregated using the aggregate function of the received query To perform an aggregation of the measure key values only for unique values (or combination of values) of group-by key(s), the measure key values need to be arranged by the corresponding group-by key values. One approach for arranging measure key values is to use hash bucket based data structure. For each row of a data set, the group-by key value(s) of the row are a) hashed to generate a hash value, b) the hash values is used to select the appropriate array of hash buckets, c) within the array of hash buckets the group-by key value(s) are used to select a particular hash bucket and d) only then, the contents of the particular hash bucket are used to aggregate with the measure key value(s). These resource-intensive a)-d) steps may be performed for millions of rows in the data set and thus consume extensive amount of computing resources.

Another approach using sort buffer technique is similarly resource intensive. The group-by key value(s) of each row are inserted into a sort buffer and thus are incrementally sorted to determine the duplicate group-by-key values, for which the measure-key values are aggregated. Even using the most efficient sort algorithm, performing these steps for millions of rows consumes extensive amount of computing resources.

Using techniques described herein, these steps may be performed only on a fraction of times by leveraging dictionary data structure(s) for group-by key(s), in one or more embodiments. The DBMS, which processes the query, iterates through a row set of encoded values in a data portion. The row set contains group-by key vector(s) and measure key vector(s) of dictionary-encoded values of the unencoded values of the group-by key(s) and measure key(s), respectively. As the DBMS iterates through the row set, the DBMS aggregates unencoded values of measure key(s) specified in the query by applying one or more aggregate functions also specified in the query. The DBMS stores the results of the aggregations in one or more payload arrays. The DBMS may maintain as many payload arrays as there are aggregate functions specified in the query.

In an embodiment, each entry of the payload array(s) corresponds to a unique encoded value of group-by key vector as specified by the column dictionary of the group-by key. The entry stores aggregate(s) of unencoded values from measure key(s) corresponding to the unique group-by key value.

In an embodiment, in which multiple group-by keys are specified by the query, the payload array contains entries corresponding to each unique combination of values from the column dictionaries of the multiple group-by keys. In such an embodiment, the DBMS may combine the group-by keys into a grouping index. The techniques described herein apply to processing queries with a single group-by key and those that include multiple group-by keys combined into a grouping index. Accordingly, the "group-by key" and "grouping index" may be used interchangeably.

Furthermore, multiple data portions may be part of the queried data set. In such an embodiment, the aggregates stored in the payload array are only partial aggregations. The partial aggregation may be further aggregated with aggregations from other data portions of the queried data set to yield the final result. To do so, the DBMS may use sort-based or hash-based matching of group-by keys to perform the final aggregation and return the result set of the group-by operation.

In an embodiment, the DBMS performs a data-portion based partial aggregation only when the number of unique combination of group-by key values does not exceed a preconfigured threshold. Such a preconfigured threshold precludes the DBMS from running out of the main memory for performing the group-by operation. The number of unique combination of group-by key values may be determined by the dictionary(s) of the group-by keys. For a single group-by key specified by the query, the length of the group-by key dictionary may be compared to the threshold to determine whether partial evaluation using techniques described here is to be used. For multiple group-by keys specified by the query, the multiplicative product of the lengths of the group-by key dictionaries (which is the number of grouping index values) is used for the comparison with the pre-defined threshold.

Figure 9:
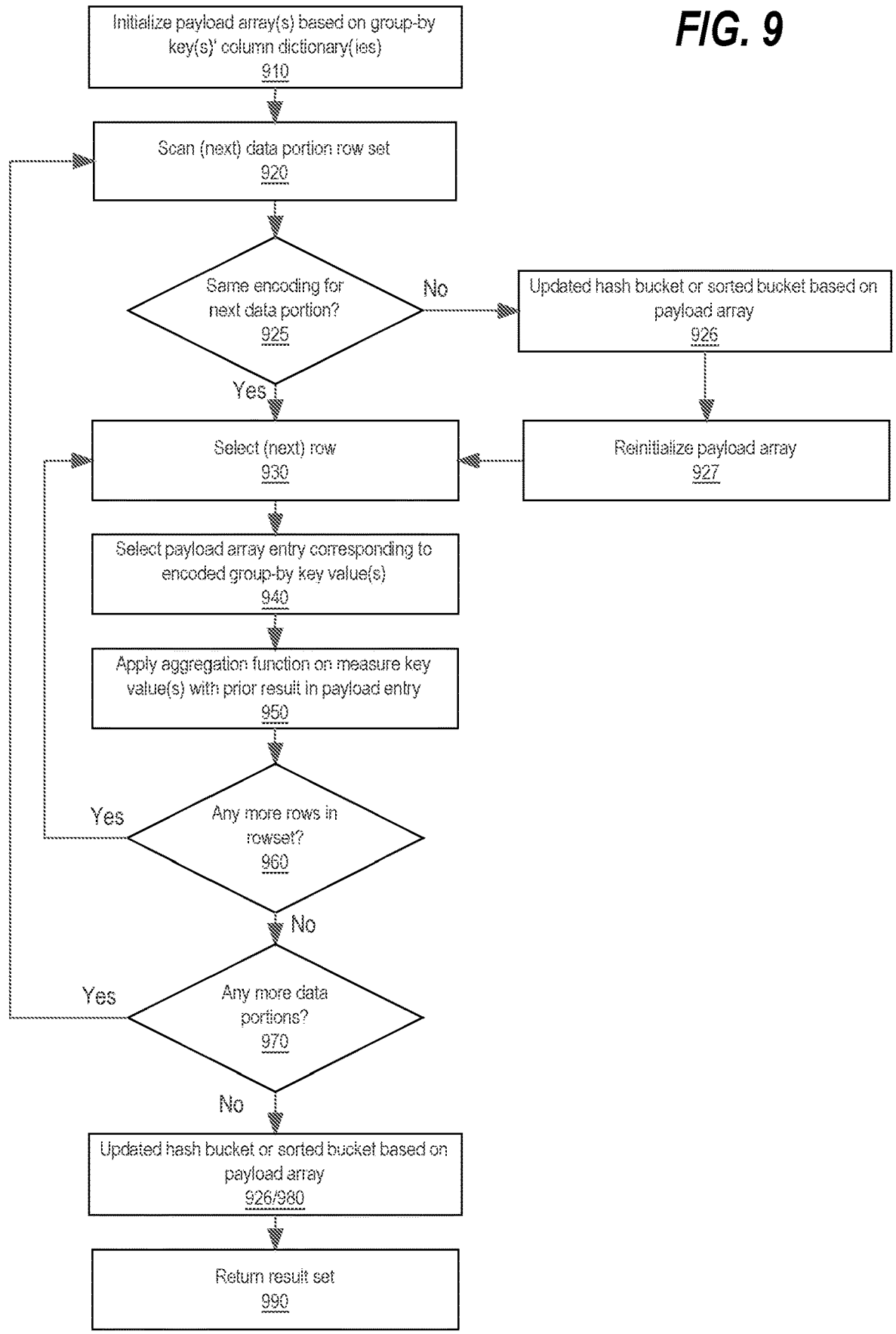
FIG. 9 is a flowchart that depicts a process for performing a group-by operation that aggregates values in a measure key using an aggregate function, in an embodiment.

FIG. 9 is a flowchart that depicts a process for performing a group-by operation that aggregates values in a measure key using an aggregate function, in an embodiment. Although, a single measure key and a single aggregate function is described for FIG. 9, the same techniques can be used for queries that specify multiple measure keys and multiple aggregate functions.

At step 910, the payload array is initialized based on the group-by key column dictionary of a data portion being scanned. The number of payload arrays may correspond to the number of aggregates selected in the received query.

The length of the payload array may correspond to the number of unique values in the group-by key. The number of unique values in the loaded data portion equals to the column dictionary length as column dictionary contains the mapping of every unique value in the column mapped to the corresponding encoding of the value. Accordingly, the length of the payload array may be initialized to the length of the group-by key dictionary length. In an embodiment in which multiple group-by keys are specified by the query, the payload array is initialized to the length of all possible permutations of group-by key column dictionary values, which is the multiplication of the length of each group-by key's column dictionary length (which, itself, is the number of grouping index values). Entries of the payload array may be initialized to zero or empty (NULL).

At step 920, the DBMS scans a data portion loaded into the main memory to process the one or more vectors and column dictionaries contained in the data portion for the group-by operation of the received query. At step 930, the DBMS selects a row from the row set of the loaded data portion. For the selected row, the DBMS retrieves the encoded group-by key value of the group-by key vector and the encoded measure key value of the measure key vector. In an embodiment, using the group-by key encoded value, the DBMS identifies the entry in the payload table, in which the previous partial aggregate value is stored, at step 940.

The group-by key may be used as an index into the payload array to retrieve the previous partial aggregate value. In an embodiment in which the query specifies multiple group-by keys, the multiple group-by key encoded values are combined to generate grouping index values for referencing the corresponding entries in the payload array.

At step 950, the DBMS may decode the measure key encoded value into the measure key unencoded value using the measure key dictionary data structure. The DBMS applies an aggregate function to the measure key unencoded value and the previous aggregate value to determine the new aggregate value. The one or more aggregate functions, described for this step of FIG. 9, may or may not be the same ones specified by the query. For example, the query may specify an averaging aggregate function but the steps may use a summing aggregate function to eventually calculate the output of the averaging aggregate function.

In an embodiment, a partial aggregate value in a payload array comprises of multiple values. Each of the values contains aggregate information necessary for accurate application of the aggregate function specified in the query. After application of the new measure key unencoded value, one or more of the values of the payload array entry may be updated accordingly.

For example, for the averaging aggregate function, each entry of the payload array may maintain the sum of the previous measure key unencoded values and the number of such previous measure key unencoded values for the corresponding group-by key encoded value. The sum and the number are updated with the new measure key unencoded value. Alternatively, each payload array entry may maintain the previously calculated average value as well as the number of previously processed measure key unencoded values.

At step 960, the next row of the row set may be similarly processed. The partial aggregate value in the payload array corresponding to the encoded group-by key value of the next row is updated by application of the aggregate function on the corresponding measure key unencoded value of the next row. This process may be repeated until all the rows in the row set of the data portion have been processed, at step 960.

If, at step 970, no other data portion is to be processed for the group-by operation, then, at step 926, the result set for the group-by operation is updated with the partial aggregates stored in the payload array as further detailed below.

Rather than continuously updating the result set with the partial aggregates in the payload array after each data portion is scanned, the DBMS may continue to aggregate the partial aggregates in the same payload array for the new data portion, in an embodiment. If the dictionary encoding is the same for the new data portion, then the unencoded values of group-by encoded keys for the new and previous data portion match. Accordingly, as long as the dictionary encoding of the new data portion is the same, the partial aggregates can be updated using the same techniques for the new data portion.

The update of the result set of the group-by operation may be delayed until after the processing of the new data portion. Skipping the update of the result set for the previous data portion saves significant computing resources for the group-by operation. Every update of the result set is costly. The update may involve hashing or sorting unencoded group-by key values to find the aggregates in the result set to be updated by the partial aggregates as described for step 926 below.

When the dictionary encoding does change for the new data portion, the DBMS updates the result set of the group-by operation with the partial aggregates of the payload array. The DBMS may re-initialize the payload array (e.g. clearing the contents of the payload array) for the next data portion processing.

At step 925 of FIG. 9, the DBMS may determine based on the metadata for the new data portion, that the dictionary encoding for the new data portion is different. At step 926, the partial aggregates calculated for the previous data portion(s) are used to update the global aggregates maintained in the result set. The result set may be maintained as a hash bucket-based data structure or sort buffer in which the global aggregates are mapped to the unencoded group-by key values (or transformations thereof).

For example, the mapping may be maintained either by storing each global aggregate in association with each unique hash of group-by key unencoded values or by storing each global aggregate in sort order defined by the unique group-by key unencoded values.

Accordingly, at step 980, the DBMS iterates through the payload array to update the result set, in an embodiment. For each entry of the payload array associated with a unique group-by key value, the DBMS looks up the corresponding global aggregate in the result set. The DBMS may select the global aggregate by hashing the unencoded value of the corresponding group-by key value or by inserting the unencoded value in the sort buffer of the result set. The DBMS applies an aggregate function on the selected global aggregate and the partial aggregate of the payload array entry to calculate the new global aggregate. When all the entries of the payload array are processed, the payload array is reinitialized (e.g. the memory space of the payload array is de-allocated), at step 927. In another embodiment, the payload array is re-used if the allocated space for the array is sufficient for the unique join-key values of the next dictionary data structure.

Once all the data portions are exhausted, at step 970, and the result set is updated at step 926 as described above, the DBMS may return the result set of the group-by operation to the user or to the next operation in the query processing at step 990.

Evaluation Functions

A DBMS may receive a query specifying one or more expressions to be evaluated on column(s) of the queried data set. The "expression key" term refers to a column specified in the expression of a query. Expressions may include one or more arithmetic, set, string, date, accounting, finance functions as an example. Unlike aggregate functions, expression functions do not aggregate values of a column into a single value but rather transform the column values to another same-size set of values. Expressions may specify a single or multiple expression keys in a query. To evaluate an expression, each row of the data set is separately evaluated—the expression key value(s) of each row are retrieved and used for the calculation of the result of the evaluation for the row. Thus, if any of the expression key value(s) are repeated from a previous row, then the evaluation for the new row re-calculates the previously evaluated expression. Such re-calculations of results may unnecessarily consume extensive amount of computing resources.

In an embodiment, a query expression evaluation leverages column dictionaries of one or more data portions to cache expression evaluation(s). The expression evaluation on an expression key may leverage the expression key dictionary data structure for tracking whether the expression has already been previously evaluated for a particular expression key value. If so, the DBMS may use the result for the previous evaluation of the expression, rather than re-evaluating the expression for the particular expression key value. Accordingly, the DBMS may save significant compute resources by skipping re-evaluation of the expressions with the same expression key values.

Figure 10:
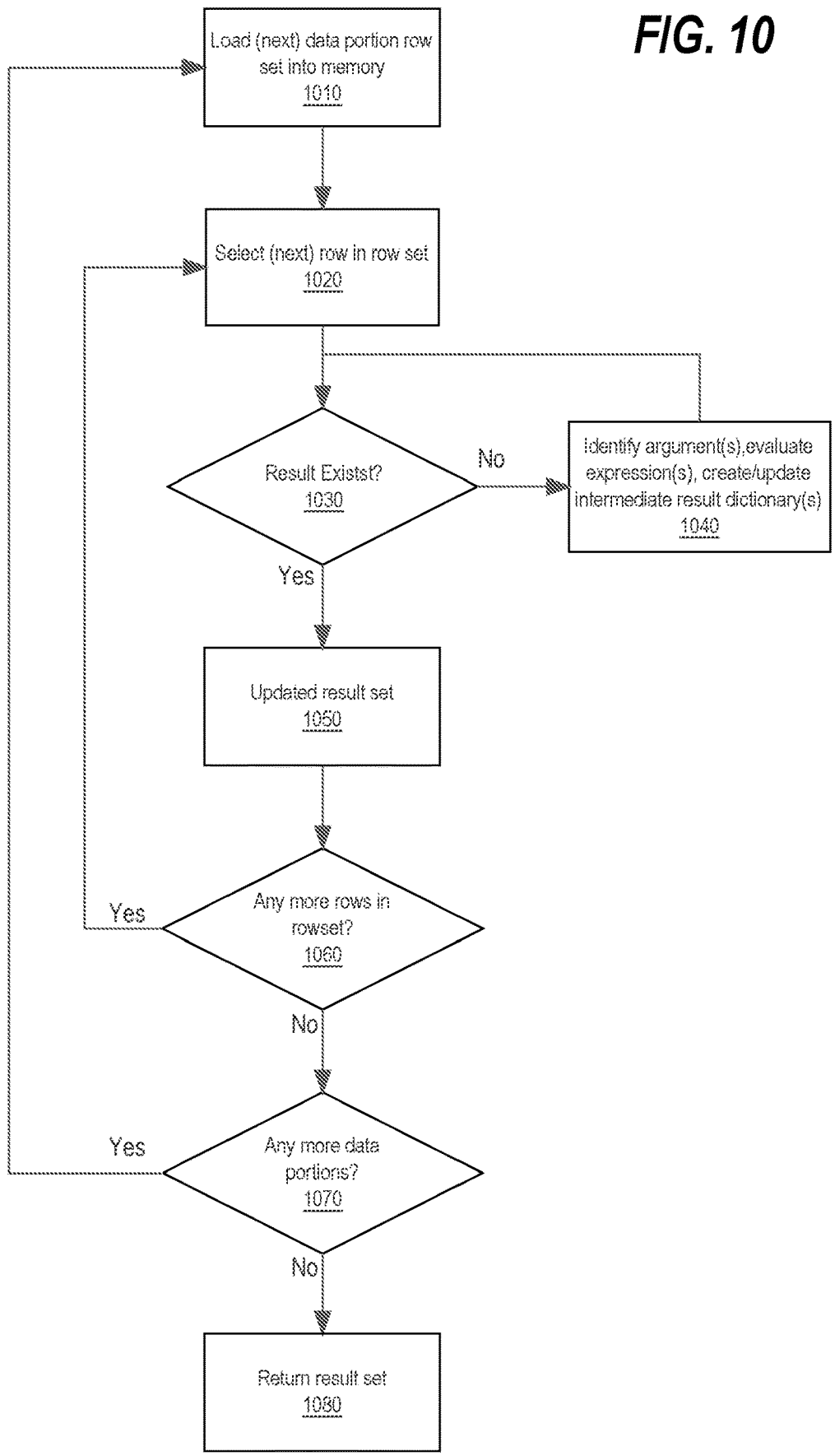
FIG. 10 is a flow chart depicting a process for evaluating expressions using column dictionary(s), in an embodiment.

FIG. 10 is a flow chart depicting a process for evaluating expressions using column dictionary(s), in an embodiment. At step 1010, the DBMS may load the first or next data portion row set into main memory for scanning. The DBMS selects encoded expression key values from the first or next row of the row set, at step 1020.

In an embodiment, the DBMS determines whether any of the expressions in the query have been previously evaluated. When an expression using one or more row values have been evaluated, the DBMS may create a corresponding entry in an expression result dictionary data structure.

In an embodiment, when expressions referenced in the received query are compounded (i.e. result of one expression is used as one of multiple input expression keys for the next expression), the DMBS initializes as many intermediate result dictionary data structures as there are intermediate results and an additional data structure for the final result. An intermediate and/or final result dictionary for an expression may be initialized to have as many entries as there are combinations of unique values of expression keys of the expression. Accordingly, the length of the result dictionary may be equal to the multiplicative product of the length of dictionaries corresponding to input columns (intermediate result dictionary or an expression key dictionary). For example, for an expression referencing a single expression key, the result dictionary may be initialized to the same length as the dictionary data structure for the expression key. On the other hand, two referenced expression keys having two-entry and four-entry length dictionaries may yield a result dictionary of eight-entry length.

At step 1030, the DBMS determines whether a final result has been calculated for the combination of the expression key encoded values of the selected row. The DBMS may identify for the encoded expression key value(s) whether a result value exists in the final result dictionary of the expression. If no result exists at step 1030, the DBMS identifies the one or more expressions that have not been calculated for the selected row, at step 1040.

In an embodiment, for each not-previously calculated expression, the DBMS identifies the expression key(s) referenced by the expression. Using the column dictionary(s) of the identified expression key(s), the DBMS retrieves the unencoded value(s) of the encoded value(s) for the selected row. The DBMS calculates the expression result using the unencoded value(s) for the expression. The DBMS stores the result in an entry of the dictionary that corresponds to the combination of the encoded expression key values (or to the single encoded expression key value if the expression uses only a single expression key as an input). The process may be repeated for the next expression, if the result of the expression is an input to the next expression.

Figure 11:
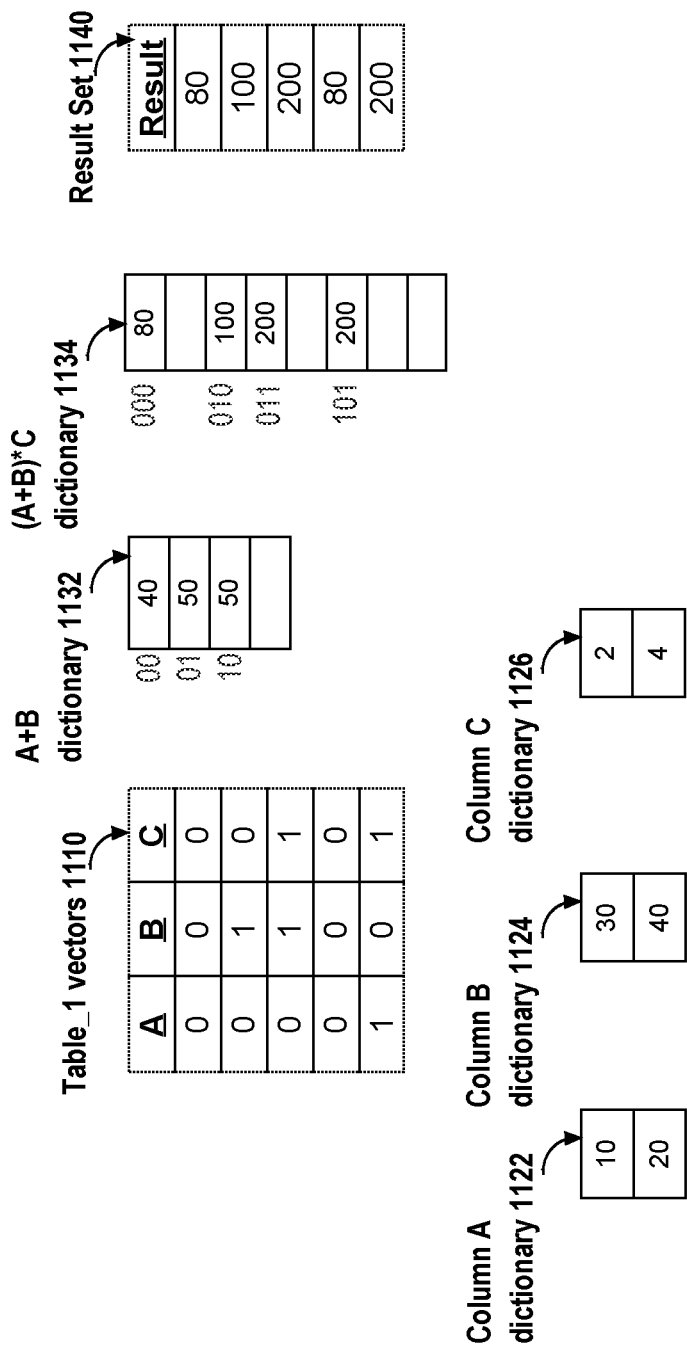
FIG. 11 is a block diagram depicting an example of intermediate result and final result dictionaries based on compounded expressions using multiple expression keys, in an embodiment.

FIG. 11 is a block diagram depicting an example of intermediate result and final result dictionaries based on compounded expressions using multiple expression keys, in an embodiment. Query Q2 is received and processed by a DBMS using the example depicted in FIG. 11.

Q2: SELECT (T.A+T.B)*T.C
    FROM Table_1 T

Using the example column vectors of Table_1 1110 and their respective dictionaries: column A dictionary 1122, column B dictionary 1124 and column C dictionary 1126 in FIG. 11, the DBMS processes a compounded expression "(A+B)*C." When DBMS scans the first two rows of Table 1 column vectors 1110, neither "A+B" intermediate dictionary 1132 nor final "(A+B)*C" dictionary 1134 have any entries yet for the corresponding expressions. Thus, the DBMS evaluates the "A+B" expression using the corresponding unencoded values of "10" and "30" for the first row to generate the value of "40" for the "00" index of "A+B" dictionary 1132. The DBMS continues the calculation of the compounded expression of this example by retrieving the unencoded value of column "C" for the first row. The retrieved column "C" value of "2" is then multiplied by the result of the first expression, "40", to yield the value of "80" for the "000" index entry of "(A+B)*C" dictionary 1134. This final result is further recorded in the first row of the result set. The second row of column vectors 1110 is similarly processed in the example of FIG. 11 for Query Q2 to yield the entries of "01" for dictionary 1132 and "010" for dictionary 1134.

When the third row of column vectors 1110 is processed, the DBMS does not have to evaluate the expression for "A+B." The combination of the encoded values for column A and B, "01", has already an entry in dictionary 1132 due to the previous evaluation for the second row. Thus, the DBMS can use the combination of the encoded values to look-up the intermediate result value in intermediate result dictionary 1132, "50". Using the looked-up value, the DBMS may proceed to retrieve the "C" column unencoded value corresponding to the encoded value in the third row. The DBMS uses the unencoded value to calculate the multiplication result to be "4*50=200". The multiplication result, "200", is stored in the entry of final result dictionary 1134 that corresponds to index of combination of encoded column values of the third row of column vectors 1110, "011". The third row of result set 1140 may also be updated with this final result.

Continuing with FIG. 10, at step 1030, if the DBMS determines that the result for the expression in the received query exists, the DBMS retrieves the result and updates the result set with the result at step 1050.

For example, continuing with the FIG. 11 and Query Q2 example, the DBMS may determine that result for the "(A+B)*C" expression already exists for the fourth row. The combination of the encoded values of the fourth row "000" have an entry for the same index in final result dictionary 1134. The DBMS may have generated the result for the entry in final result set dictionary 1134 when the DBMS evaluated the first row of column vectors 1110 having the same encoded values for columns "A", "B", and "C". Accordingly, the DBMS may skip the re-evaluation of the expression for the same values and save considerable compute resources. The DBMS may use the value of "80" at the "000" entry in final result dictionary to update the result set 1140's fourth row.

Continuing with FIG. 10, at step 1060, the DBMS repeats the techniques described above for each row in the row set for the selected/loaded data portion.

At step 1070, if another data portion exists for the queried data set, a new data portion is loaded into main memory at step 1010. Otherwise, the result set is produced for the query or for the next operation of the query.

In an embodiment, for the new data portion, the DBMS may check the metadata to determine whether the dictionary encoding of the new data portion is different from the previous data portion. If so, the DBMS may have to de-allocate/clear the intermediate or final dictionaries generated for the previous data portion. However, if the dictionary encoding of the next data portion has not changed, then the DBMS may save considerable resources by re-using the result dictionary(s) from the previous data portion. If the dictionaries are re-used, then the DBMS may need only to perform expression evaluations for combinations of expression key encoded values that have not been encountered in the previous data portion(s).

Once all the data portions are exhausted at step 1070, the DBMS may return the result set of the group-by operation to the user or to the next operation in the query processing at step 1080.

Database Management Systems

A database management system (DBMS) manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

In an embodiment, a DBMS may be connected to or include a cluster of nodes that may store one or more tables. The DBMS may manage tables stored on the cluster of nodes similar to managing tables stored in persistent storage.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the invention are described herein using the term "SQL", the invention is not limited to just this particular database query language, and may be used in conjunction with other database query languages and constructs.

A client may issue a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Software Overview

Figure 12:
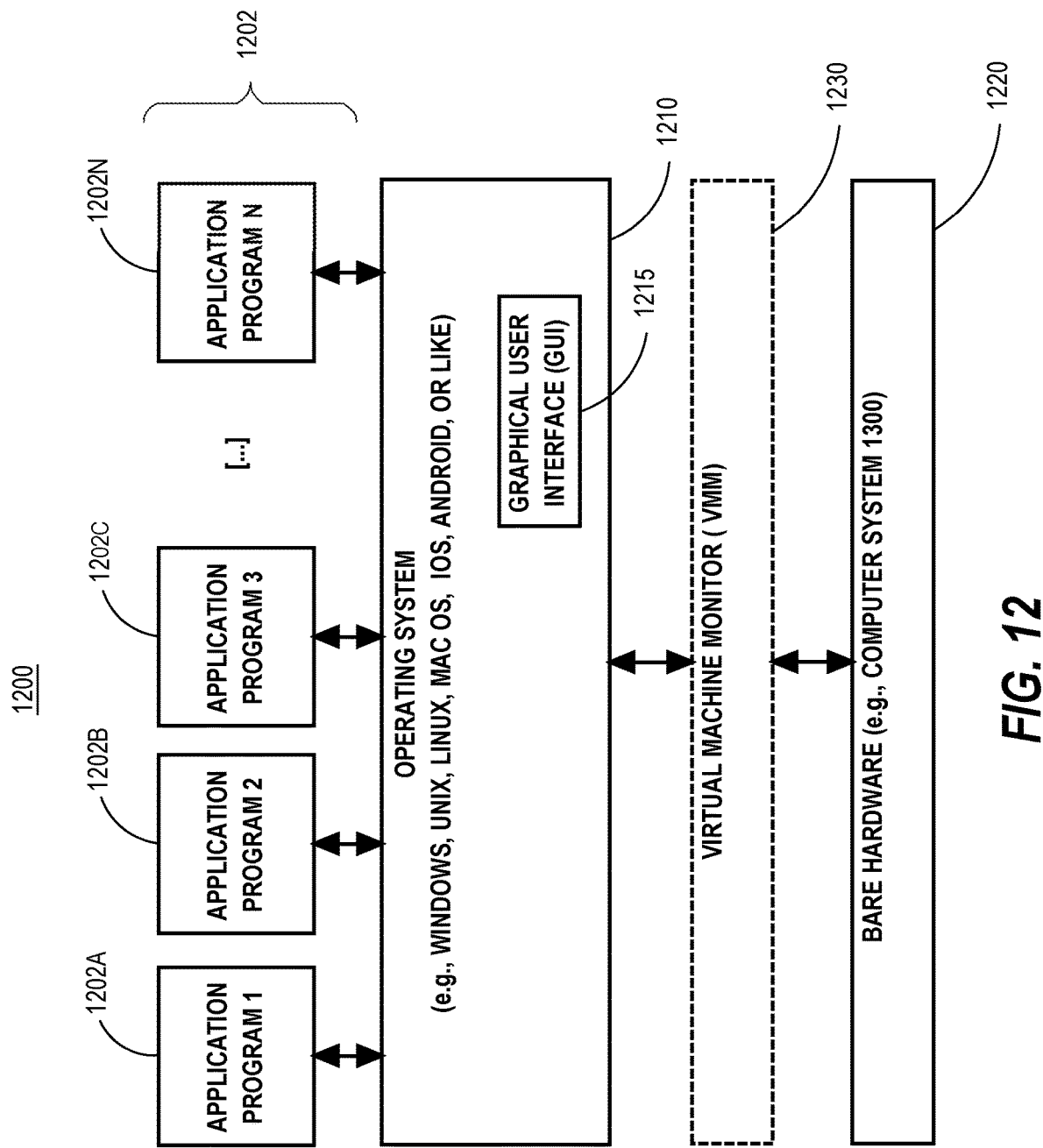
FIG. 12 is a block diagram of a basic software system that may be employed for controlling the operation of a computing system according to an embodiment.
Figure 13:
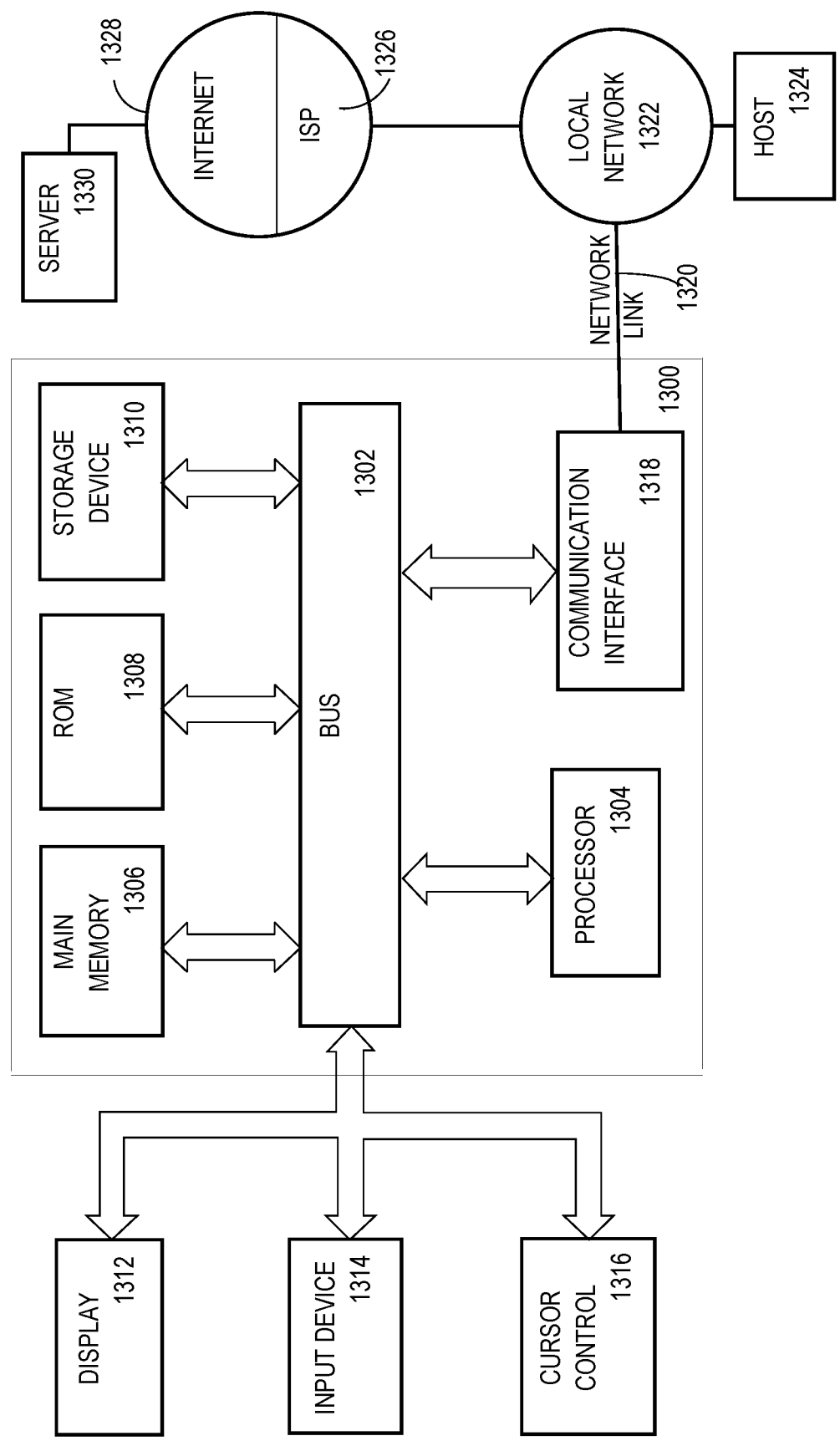
FIG. 13 is a block diagram illustrating a computer system that may be used to implement the techniques described herein.

FIG. 12 is a block diagram of a basic software system 1200 that may be employed for controlling the operation of computing system 1300 of FIG. 13. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computing system 1300. Software system 1200, which may be stored in system memory (RAM) 1306 and on fixed storage (e.g., hard disk or flash memory) 1310, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1310 into main memory 1306) for execution by the system 1200. The applications or other software intended for use on computer system 1300 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1304) of computer system 1300. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1300.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1300 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements.

For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory (also referred herein as "volatile memory") 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Computing Nodes and Clusters

A computing node is a combination of one or more hardware processors that each share access to a byte addressable memory. Each hardware processor is electronically coupled to registers on the same chip of the hardware processor and is capable of executing an instruction that references a memory address in the addressable memory and that causes the hardware processor to load data at that memory address into any of the registers. In addition, a hardware processor may have access to its separate exclusive memory that is not accessible to other processors. The one or more hardware processors may be running under the control of the same operating system A hardware processor may be comprised of multiple core processors on the same chip, each core processor ("core") being capable of separately executing a machine code instruction within the same clock cycles as another of the multiple cores. Each core processor may be electronically coupled to connect to a scratch pad memory that cannot be accessed by any other core processor of the multiple core processors.

A cluster comprises computing nodes that each communicate with each other via a network. Each node in a cluster may be coupled to a network card or a network integrated circuit on the same board of the computing node. Network communication between any two nodes occurs via the network card or network integrated circuit on one of the nodes and a network card or network integrated circuit of another one of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   receiving a query that requests a join operation between a first table and a second table based on a first join key column of said first table and a second join key column of said second table, wherein data of the first table is stored in storage data units:
  a storage data unit of the storage data units storing a probe-side row set of said first table, the probe-side row set comprising one or more column vectors that includes a join key column vector corresponding to said first join key column, and
  each cell element of the join key column vector of the probe-side row set comprising a respective dictionary encoded value of a corresponding unencoded value of the first join key column at a corresponding row of the first table, wherein the respective dictionary encoded value, of said each cell element, is mapped to the corresponding unencoded value by a dictionary data structure of the join key column vector;
performing the join operation by at least:
  comparing each unencoded value in the dictionary data structure with join key column values of the second join key column of the second table;
  based on the comparing, generating a payload array, wherein each entry in the payload array corresponds to a dictionary entry of a respective unencoded value in the dictionary data structure, and indicates whether said respective unencoded value in the dictionary data structure matches at least one join key column value of the second join key column of the second table;
  updating a result set of the join operation for one or more probe-side rows in the probe-side row set, at least by:
    for each probe-side row in the one or more probe-side rows, selecting a particular payload array entry in the payload array, based on a particular dictionary-encoded value, of said each probe-side row, being associated with the particular payload array entry,
    determining, from the particular payload array entry, whether a particular unencoded value, mapped to the particular dictionary-encoded value in the dictionary data structure, matched with at least one second table row of the second table, and
    based on determining that the particular unencoded value matched, updating an entry in the result set with information of the at least one second table row of the second table and of said each probe-side row.

2. The method of claim 1, further comprising scanning each row in the probe-side row set, and selecting the one or more probe-side rows in the probe-side row set for updating the result set based on a corresponding value in a skip-bit vector of the probe-side row set.

3. The method of claim 1, further comprising:
after updating the result set, loading a second probe-side row set of the first table into memory;
determining whether a dictionary encoding for the second probe-side row set is the same as a dictionary encoding for the probe-side row set;
based on the determining that dictionary encoding for the second probe-side row set is the same as the dictionary encoding for the probe-side row set, updating the result set based on rows in the second probe-side row set using the payload array generated for the probe-side row set.

4. The method of claim 1, further comprising:
based on comparing each unencoded value in the dictionary data structure with the join key column values of the second join key column of the second table, determining that a certain unencoded value in the dictionary data structure matches a certain join key column value of the second join key column of the second table;
updating a certain payload array entry, in the payload array, that is associated with the certain unencoded value, to indicate that the certain unencoded value in the dictionary data structure has matched with the certain join key column value of the second join key column of the second table; and
storing, in the certain payload array entry of the payload array, a data pointer to a second table row of the certain join key column value.

5. The method of claim 1, further comprising:
based on comparing each unencoded value in the dictionary data structure with the join key column values of the second join key column of the second table, determining that a certain unencoded value in the dictionary data structure matches a certain join key column value of the second join key column of the second table;
at a certain payload array entry of the payload array that is associated with the certain unencoded value, storing data from a second table row of the certain join key column value.

6. The method of claim 1, wherein each matched entry in the payload array stores one or more data pointers to one or more matched rows of the second table; and
the method further comprising:
  before the updating of the result set, for said each matched entry, resolving one or more data pointers to one or more matched rows of the second table;
  based on the resolving the one or more data pointers, storing data from the one or more matched rows of the second table in association with said matched entry.

7. The method of claim 1,
wherein the join operation is an outer join operation on the second join key column of the second table;
and the method further comprises:
  indicating one or more unmatched join key values that failed to match after scanning row sets in the storage data units of the first table;
  updating the result set with data from unmatched second table rows of the one more unmatched join key values.

8. The method of claim 1,
wherein the join operation is an outer join operation on the first join key column of the first table;
and wherein the method further comprises for at least one probe-side row in the one or more probe-side rows, updating the result set of the join operation comprises:
  selecting a certain payload array entry in the payload array for said at least one probe-side row, based on a certain dictionary-encoded value, of the join key column vector for said at least one probe-side row, being mapped, in the dictionary data structure, to a certain unencoded value associated with the certain payload array entry,
  determining based on the certain payload array entry that the certain unencoded value has no match with the join key column values of the second table, and
  updating a certain entry in the result set with data from said at least one probe-side row without the certain entry referencing any data for the second table for the certain payload array entry.

9. A computer-implemented method comprising:
  receiving a query that requests an aggregation operation of a measure key column of a data set based on one or more group-by key columns of the data set, wherein data of the data set is stored in storage data units:
    a storage data unit storing a row set of a plurality of rows sets of the data set, the row set comprising one or more column vectors that includes one or more group-by key vectors corresponding to the one or more group-by key columns and a measure key vector corresponding to the measure key column,
    each group-by key cell element of the one or more group-by key columns of said row set comprising a respective dictionary encoded group-by key value of a corresponding unencoded group-by key value of the one or more group-by key columns at a corresponding row of the data set,
    wherein the respective dictionary encoded group-by key value, of said each group-by key cell element, is mapped to the corresponding unencoded group-by key value by one or more group-by key dictionary data structures of the one or more group-by key columns;
  performing the aggregation operation by at least:
    generating a payload array for said row set of the plurality of row sets by at least aggregating a first unencoded measure key value with a second unencoded measure key values, wherein a corresponding first dictionary encoded measure key value and a corresponding second dictionary encoded measure key value correspond to same one or more dictionary encoded group-by values;
    based on the payload array, updating a result set for the aggregation operation.

10. The method of claim 9, wherein generating the payload array for said row set of the plurality of row sets comprises:
  for each measure key cell element of the measure key vector, said each measure key cell element of the measure key vector of said row set comprising a respective dictionary encoded measure key value of a corresponding unencoded measure key value of the measure key column at a corresponding row of the data set, wherein the respective dictionary encoded measure key value is mapped to the corresponding unencoded measure key value by a measure key dictionary data structure of the measure key column:
    selecting one or more corresponding dictionary-encoded group-by key values from the one or more group-by key vectors;
    identifying, in the payload array, a previously aggregated value that corresponds to the one or more corresponding dictionary-encoded group-by key values;
    aggregating the corresponding unencoded measure key value with the previously aggregated value to generate a new aggregated value for the one or more corresponding dictionary-encoded group-by key values;
    updating the payload array with the new aggregated value in association with the one or more corresponding dictionary-encoded group-by key values.

11. The method of claim 10, further comprising, for the measure key cell element of the measure key vector,
  identifying, in the payload array, the previously aggregated value that corresponds to the one or more corresponding dictionary-encoded group-by key values at least by:
    combining the one or more corresponding dictionary-encoded group-by key values into a corresponding grouping index value for the measure key cell element, and
    using the corresponding grouping index value as an index into the payload array, identifying the previously aggregated value in the payload array.

12. The method of claim 9, further comprising:
  after updating the result set, loading a next storage data unit into a memory, the next storage data unit storing a second row set of the data set;
  determining whether a dictionary encoding for the second row set is the same as a dictionary encoding for said row set;
  based on the determining that the dictionary encoding for the second row set is the same as the dictionary encoding for said row set, continuing to update the payload array with aggregated values aggregated using the second row set.

13. The method of claim 9, further comprising, in the payload array, storing, in association with each aggregated value of aggregated values in the payload array, one or more corresponding unencoded group-by key values.

14. The method of claim 9, further comprising, in the result set, storing, in association with each globally aggregated value of globally aggregated values in the payload array, one or more corresponding unencoded group-by key values.

15. The method of claim 9, further comprising:
  hashing each one or more unencoded group-by key values in the payload array thereby generating a hash for each aggregated value of aggregated values in the payload array;
  using the hash for said each aggregated value of the aggregated values in the payload array, identifying a corresponding global aggregated value of global aggregated values in the result set;
  aggregating said each aggregated value with the corresponding global aggregated value of the global aggregated values in the result set.

16. The method of claim 9, further comprising:
  using each one or more unencoded group-by key values for each aggregated value of aggregated values in the payload array, identifying a corresponding global aggregated value of global aggregated values in the result set based on sorting said each aggregated value with the global aggregated values in the result set;
  aggregating said each aggregated value with the corresponding global aggregated value in the result set.

17. The method of claim 9, further comprising:
  determining a multiplicative product of lengths of the one or more group-by key dictionary data structures of the one or more group-by key columns; and
  based on determining that the multiplicative product is below a pre-defined threshold, proceeding to the performing the aggregation operation.

18. A computer-implemented method comprising:
  receiving a query that requests an evaluation of one or more expression key columns of a data set using one or more expressions specified in the query, wherein data of the data set is stored in storage data units:
    a storage data unit of the storage data units storing a row set of a plurality of row sets of the data set, the row set comprising one or more column vectors including one or more expression key vectors corresponding to the one or more expression key columns, each cell element of the of the one or more expression key vectors comprising a respective dictionary encoded value of a corresponding unencoded value of the one or more expression key columns at a corresponding row of the data set, wherein the respective dictionary encoded value, of said each cell element, is mapped to the corresponding unencoded value by one or more expression key dictionary data structures of the one or more expression key columns;

performing the evaluation at least in part by, for each row in the row set:

selecting one or more dictionary-encoded expression key values, corresponding to said row, from the one or more expression key vectors of the one or more expression key columns;

determining whether, for the one or more dictionary-encoded expression key values, a result value of the one or more expressions exists in an expression result mapping data structure;

wherein the expression result mapping data structure maps one or more unique combinations of dictionary-encoded expression key values, from the one or more expression key dictionary data structures of the one or more expression key vectors, to expression result values;

wherein the expression result values are calculated by evaluating the one or more expressions on one or more expression key unencoded values corresponding to the one or more unique combinations of dictionary-encoded expression key values in the one or more expression key dictionary data structures; and updating a result set for the evaluation with the result value from the expression result mapping data structure.

19. The method of claim 18, further comprising:
based on determining that, for the one or more dictionary-encoded expression key values, a result value of the one or more expressions does not exist in the expression result mapping data structure:

using the one or more dictionary-encoded expression key values, selecting the one or more expression key unencoded values from the one or more expression key dictionary data structures;

calculating the result value at least by evaluating the one or more expressions on the one or more expression key unencoded values;

storing the result value in the expression result mapping data structure in association with the one or more unique combinations of dictionary-encoded expression key values.

20. The method of claim 18, further comprising:
based on determining that, for the one or more dictionary-encoded expression key values, the result value of the one or more expressions does not exist in the expression result mapping data structure:

using at least one dictionary-encoded expression key value of the one or more dictionary-encoded expression key values, selecting an intermediate result value from an intermediate result mapping data structure;

wherein the intermediate result mapping data structure maps one or more particular dictionary-encoded expression key values, from a particular expression key dictionary data structure of the one or more expression key vectors, to intermediate result values;

wherein the intermediate result values are calculated by evaluating at least one expression of the one or more expressions on particular expression key unencoded values corresponding to the one or more particular dictionary-encoded expression key values in the particular expression key dictionary data structure; and calculating the result value of the one or more expressions based on the intermediate result value;

storing the result value in the expression result mapping data structure in association with the one or more dictionary-encoded expression key values.

21. One or more non-transitory storage media storing set of instructions which, when executed by one or more hardware processors, causes:

receiving a query that requests a join operation between a first table and a second table based on a first join key column of said first table and a second join key column of said second table, wherein data of the first table is stored in storage data units:

a storage data unit of the storage data units storing a probe-side row set of said first table, the probe-side row set comprising one or more column vectors that includes a join key column vector corresponding to said first join key column, and each cell element of the join key column vector of the probe-side row set comprising a respective dictionary encoded value of a corresponding unencoded value of the first join key column at a corresponding row of the first table, wherein the respective dictionary encoded value, of said each cell element, is mapped to the corresponding unencoded value by a dictionary data structure of the join key column vector;

performing the join operation by at least:
comparing each unencoded value in the dictionary data structure with join key column values of the second join key column of the second table;

based on the comparing, generating a payload array, wherein each entry in the payload array corresponds to a dictionary entry of a respective unencoded value in the dictionary data structure, and indicates whether said respective unencoded value in the dictionary data structure matches at least one join key column value of the second join key column of the second table;

updating a result set of the join operation for one or more probe-side rows in the probe-side row set, at least by:

for each probe-side row in the one or more probe-side rows, selecting a particular payload array entry in the payload array, based on a particular dictionary-encoded value, of said each probe-side row, being associated with the particular payload array entry, determining, from the particular payload array entry, whether a particular unencoded value, mapped to the particular dictionary-encoded value in the dictionary data structure, matched with at least one second table row of the second table, and based on determining that the particular unencoded value matched, updating an entry in the result set with information of the at least one second table row of the second table and of said each probe-side row.

22. The one or more non-transitory storage media of claim 21, wherein the set of instructions includes instructions, which, when executed by the one or more hardware processors, cause scanning each row in the probe-side row set, and selecting the one or more probe-side rows in the probe-side row set for updating the result set based on a corresponding value in a skip-bit vector of the probe-side row set.

23. The one or more non-transitory storage media of claim 21, wherein the set of instructions includes instructions, which, when executed by the one or more hardware processors, cause:
  after updating the result set, loading a second probe-side row set of the first table into memory;
  determining whether a dictionary encoding for the second probe-side row set is the same as a dictionary encoding for the probe-side row set;
  based on the determining that dictionary encoding for the second probe-side row set is the same as the dictionary encoding for the probe-side row set, updating the result set based on rows in the second probe-side row set using the payload array generated for the probe-side row set.

24. The one or more non-transitory storage media of claim 21, wherein the set of instructions includes instructions, which, when executed by the one or more hardware processors, cause:
  based on comparing each unencoded value in the dictionary data structure with the join key column values of the second join key column of the second table, determining that a certain unencoded value in the dictionary data structure matches a certain join key column value of the second join key column of the second table;
  updating a certain payload array entry, in the payload array, that is associated with the certain unencoded value, to indicate that the certain unencoded value in the dictionary data structure has matched with the certain join key column value of the second join key column of the second table; and
  storing, in the certain payload array entry of the payload array, a data pointer to a second table row of the certain join key column value.

25. The one or more non-transitory storage media of claim 21, wherein the set of instructions includes instructions, which, when executed by the one or more hardware processors, cause:
  based on comparing each unencoded value in the dictionary data structure with the join key column values of the second join key column of the second table, determining that a certain unencoded value in the dictionary data structure matches a certain join key column value of the second join key column of the second table;
  at a certain payload array entry of the payload array that is associated with the certain unencoded value, storing data from a second table row of the certain join key column value.

26. The one or more non-transitory storage media of claim 21, wherein each matched entry in the payload array stores one or more data pointers to one or more matched rows of the second table; and
  wherein the set of instructions includes instructions, which, when executed by the one or more hardware processors, cause:
    before the updating of the result set, for said each matched entry, resolving one or more data pointers to one or more matched rows of the second table;
    based on the resolving the one or more data pointers, storing data from the one or more matched rows of the second table in association with said matched entry.

27. The one or more non-transitory storage media of claim 21,
  wherein the join operation is an outer join operation on the second join key column of the second table;
  and wherein the set of instructions includes instructions, which, when executed by the one or more hardware processors, cause:
    indicating one or more unmatched join key values that failed to match after scanning row sets in the storage data units of the first table;
    updating the result set with data from unmatched second table rows of the one more unmatched join key values.

28. The one or more non-transitory storage media of claim 21,
  wherein the join operation is an outer join operation on the first join key column of the first table;
  and wherein the set of instructions includes instructions, which, when executed by the one or more hardware processors, cause, for at least one probe-side row in the one or more probe-side rows, updating the result set of the join operation, which comprises:
    selecting a certain payload array entry in the payload array for said at least one probe-side row, based on a certain dictionary-encoded value, of the join key column vector for said at least one probe-side row, being mapped, in the dictionary data structure, to a certain unencoded value associated with the certain payload array entry,
    determining based on the certain payload array entry that the certain unencoded value has no match with the join key column values of the second table, and
    updating a certain entry in the result set with data from said at least one probe-side row without the certain entry referencing any data for the second table for the certain payload array entry.

29. One or more non-transitory storage media storing set of instructions which, when executed by one or more hardware processors, causes:
  receiving a query that requests an aggregation operation of a measure key column of a data set based on one or more group-by key columns of the data set, wherein data of the data set is stored in storage data units:
    a storage data unit storing a row set of a plurality of rows sets of the data set, the row set comprising one or more column vectors that includes one or more group-by key vectors corresponding to the one or more group-by key columns and a measure key vector corresponding to the measure key column,
    each group-by key cell element of the one or more group-by key columns of said row set comprising a respective dictionary encoded group-by key value of a corresponding unencoded group-by key value of the one or more group-by key columns at a corresponding row of the data set,
    wherein the respective dictionary encoded group-by key value, of said each group-by key cell element, is mapped to the corresponding unencoded group-by key value by one or more group-by key dictionary data structures of the one or more group-by key columns;

performing the aggregation operation by at least:
generating a payload array for said row set of the plurality of row sets by at least aggregating a first unencoded measure key value with a second unencoded measure key values, wherein a corresponding first dictionary encoded measure key value and a corresponding second dictionary encoded measure key value correspond to same one or more dictionary encoded group-by values;

based on the payload array, updating a result set for the aggregation operation.

30. The one or more non-transitory storage media of claim 29, wherein the set of instructions includes instructions, which, when executed by the one or more hardware processors, cause:

for each measure key cell element of the measure key vector, said each measure key cell element of the measure key vector of said row set comprising a respective dictionary encoded measure key value of a corresponding unencoded measure key value of the measure key column at a corresponding row of the data set, wherein the respective dictionary encoded measure key value is mapped to the corresponding unencoded measure key value by a measure key dictionary data structure of the measure key column:

selecting one or more corresponding dictionary-encoded group-by key values from the one or more group-by key vectors;

identifying, in the payload array, a previously aggregated value that corresponds to the one or more corresponding dictionary-encoded group-by key values;

aggregating the corresponding unencoded measure key value with the previously aggregated value to generate a new aggregated value for the one or more corresponding dictionary-encoded group-by key values;

updating the payload array with the new aggregated value in association with the one or more corresponding dictionary-encoded group-by key values.

31. The one or more non-transitory storage media of claim 30, wherein the set of instructions includes instructions, which, when executed by the one or more hardware processors, cause, for the measure key cell element of the measure key vector, identifying, in the payload array, the previously aggregated value that corresponds to the one or more corresponding dictionary-encoded group-by key values at least by:

combining the one or more corresponding dictionary-encoded group-by key values into a corresponding grouping index value for the measure key cell element, and using the corresponding grouping index value as an index into the payload array, identifying the previously aggregated value in the payload array.

32. The one or more non-transitory storage media of claim 29, wherein the set of instructions includes instructions, which, when executed by the one or more hardware processors, cause:

after updating the result set, loading a next storage data unit into a memory, the next storage data unit storing a second row set of the data set;

determining whether a dictionary encoding for the second row set is the same as a dictionary encoding for said row set;

based on the determining that the dictionary encoding for the second row set is the same as the dictionary encoding for said row set, continuing to update the payload array with aggregated values aggregated using the second row set.

33. The one or more non-transitory storage media of claim 29, wherein the set of instructions includes instructions, which, when executed by the one or more hardware processors, cause, in the payload array, storing, in association with each aggregated value of aggregated values in the payload array, one or more corresponding unencoded group-by key values.

34. The one or more non-transitory storage media of claim 29, wherein the set of instructions includes instructions, which, when executed by the one or more hardware processors, cause, in the result set, storing, in association with each globally aggregated value of globally aggregated values in the payload array, one or more corresponding unencoded group-by key values.

35. The one or more non-transitory storage media of claim 29, wherein the set of instructions includes instructions, which, when executed by the one or more hardware processors, cause:

hashing each one or more unencoded group-by key values in the payload array thereby generating a hash for each aggregated value of aggregated values in the payload array;

using the hash for said each aggregated value of the aggregated values in the payload array, identifying a corresponding global aggregated value of global aggregated values in the result set;

aggregating said each aggregated value with the corresponding global aggregated value of the global aggregated values in the result set.

36. The one or more non-transitory storage media of claim 29, wherein the set of instructions includes instructions, which, when executed by the one or more hardware processors, cause:

using each one or more unencoded group-by key values for each aggregated value of aggregated values in the payload array, identifying a corresponding global aggregated value of global aggregated values in the result set based on sorting said each aggregated value with the global aggregated values in the result set;

aggregating said each aggregated value with the corresponding global aggregated value in the result set.

37. The one or more non-transitory storage media of claim 29, wherein the set of instructions includes instructions, which, when executed by the one or more hardware processors, cause:

determining a multiplicative product of lengths of the one or more group-by key dictionary data structures of the one or more group-by key columns; and based on determining that the multiplicative product is below a pre-defined threshold, proceeding to the performing the aggregation operation.

38. One or more non-transitory storage media storing set of instructions which, when executed by one or more hardware processors, causes:

receiving a query that requests an evaluation of one or more expression key columns of a data set using one or more expressions specified in the query, wherein data of the data set is stored in storage data units:

a storage data unit of the storage data units storing a row set of a plurality of row sets of the data set, the row set comprising one or more column vectors including one or more expression key vectors corresponding to the one or more expression key columns, each cell element of the of the one or more expression key vectors comprising a respective dictionary encoded value of a corresponding unencoded value of the one or more expression key columns at a corresponding row of the data set, wherein the respective dictionary encoded value, of said each cell element, is mapped to the corresponding unencoded value by one or more expression key dictionary data structures of the one or more expression key columns;

performing the evaluation at least in part by, for each row in the row set:

selecting one or more dictionary-encoded expression key values, corresponding to said row, from the one or more expression key vectors of the one or more expression key columns;

determining whether, for the one or more dictionary-encoded expression key values, a result value of the one or more expressions exists in an expression result mapping data structure;

wherein the expression result mapping data structure maps one or more unique combinations of dictionary-encoded expression key values, from the one or more expression key dictionary data structures of the one or more expression key vectors, to expression result values;

wherein the expression result values are calculated by evaluating the one or more expressions on one or more expression key unencoded values corresponding to the one or more unique combinations of dictionary-encoded expression key values in the one or more expression key dictionary data structures; and updating a result set for the evaluation with the result value from the expression result mapping data structure.

39. The one or more non-transitory storage media of claim 38, wherein the set of instructions includes instructions, which, when executed by the one or more hardware processors, cause:

based on determining that, for the one or more dictionary-encoded expression key values, a result value of the one or more expressions does not exist in the expression result mapping data structure:

using the one or more dictionary-encoded expression key values, selecting the one or more expression key unencoded values from the one or more expression key dictionary data structures;

calculating the result value at least by evaluating the one or more expressions on the one or more expression key unencoded values;

storing the result value in the expression result mapping data structure in association with the one or more unique combinations of dictionary-encoded expression key values.

40. The one or more non-transitory storage media of claim 38, wherein the set of instructions includes instructions, which, when executed by the one or more hardware processors, cause:

based on determining that, for the one or more dictionary-encoded expression key values, the result value of the one or more expressions does not exist in the expression result mapping data structure:

using at least one dictionary-encoded expression key value of the one or more dictionary-encoded expression key values, selecting an intermediate result value from an intermediate result mapping data structure;

wherein the intermediate result mapping data structure maps one or more particular dictionary-encoded expression key values, from a particular expression key dictionary data structure of the one or more expression key vectors, to intermediate result values;

wherein the intermediate result values are calculated by evaluating at least one expression of the one or more expressions on particular expression key unencoded values corresponding to the one or more particular dictionary-encoded expression key values in the particular expression key dictionary data structure; and calculating the result value of the one or more expressions based on the intermediate result value;

storing the result value in the expression result mapping data structure in association with the one or more dictionary-encoded expression key values.

* * * * *

UNITED STATES PATENT AND TRADEMARK OFFICE
CERTIFICATE OF CORRECTION

PATENT NO. : 10,572,475 B2
APPLICATION NO. : 15/713365
DATED : February 25, 2020
INVENTOR(S) : Li et al.

Page 1 of 1

It is certified that error appears in the above-identified patent and that said Letters Patent is hereby corrected as shown below:

On the Title Page

In Column 2, under Abstract, Lines 9-10, delete "unencoded, unencoded," and insert -- unencoded --, therefor.

In the Drawings

On sheet 11 of 14, in FIG. 10, under Reference Numeral 1030, Line 1, delete "Existst?" and insert -- Exists? --, therefor.

In the Specification

In Column 16, Line 18, delete "query" and insert -- query. --, therefor.

In Column 28, Line 34, delete "system" and insert -- system. --, therefor.

In the Claims

In Column 30, Line 46, in Claim 7, delete "one more" and insert -- one or more --, therefor.

In Column 33, Line 5, in Claim 18, delete "of the of the" and insert -- of the --, therefor.

In Column 36, Line 20, in Claim 27, delete "one more" and insert -- one or more --, therefor.

In Column 39, Line 7, in Claim 38, delete "of the of the" and insert -- of the --, therefor.

Signed and Sealed this
Seventeenth Day of November, 2020

Andrei Iancu
*Director of the United States Patent and Trademark Office*